US012137198B2

(12) United States Patent
Hanamoto

(10) Patent No.: US 12,137,198 B2
(45) Date of Patent: Nov. 5, 2024

(54) PROVIDING APPARATUS, PROVIDING METHOD AND COMPUTER READABLE STORAGE MEDIUM FOR PERFORMING PROCESSING RELATING TO A VIRTUAL VIEWPOINT IMAGE

(71) Applicant: CANON KABUSHIKI KAISHA, Tokyo (JP)

(72) Inventor: Takashi Hanamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/220,589

(22) Filed: Jul. 11, 2023

(65) Prior Publication Data

US 2023/0353716 A1    Nov. 2, 2023

Related U.S. Application Data

(63) Continuation of application No. 17/517,055, filed on Nov. 2, 2021, now Pat. No. 11,750,786, which is a
(Continued)

(30) Foreign Application Priority Data

Sep. 19, 2017    (JP) ................ 2017-179010

(51) Int. Cl.
*H04N 13/111*    (2018.01)
*A63F 13/355*    (2014.01)
*A63F 13/52*    (2014.01)
*G06T 17/00*    (2006.01)
*G06T 17/05*    (2011.01)

(52) U.S. Cl.
CPC .......... *H04N 13/111* (2018.05); *A63F 13/355* (2014.09); *A63F 13/52* (2014.09);
(Continued)

(58) Field of Classification Search
None
See application file for complete search history.

(56) References Cited

U.S. PATENT DOCUMENTS 9,266,017 B1 *   2/2016  Parker ................. A63F 13/77
2009/0128568 A1 * 5/2009  Gloudemans ........ G06V 10/273
                                                    345/474
(Continued)

FOREIGN PATENT DOCUMENTS

CN          1809844 A      7/2006
CN        101271591 A      9/2008
(Continued)

OTHER PUBLICATIONS

Carranza, Joel, et al., "Free-viewpoint video of human actors" ACM transactions on graphics (TOG) 22.3 (Jul. 2003) pp. 569-577.
(Continued)

*Primary Examiner* — Frank S Chen
(74) *Attorney, Agent, or Firm* — Carter, DeLuca & Farrell LLP

(57) ABSTRACT

A providing apparatus configured to provide three-dimensional geometric data to be used to generate a virtual viewpoint image receives a data request from a communication apparatus, decides which of a plurality of pieces of three-dimensional geometric data including first three-dimensional geometric data and second three-dimensional geometric data with a different quality than the first three-dimensional geometric data is to be provided to the communication apparatus from which the received data request was transmitted, and provides the three-dimensional geometric data decided on from among the plurality of pieces of three-dimensional geometric data, to the communication apparatus as a response to the received data request.

6 Claims, 18 Drawing Sheets

Related U.S. Application Data continuation of application No. 16/928,503, filed on Jul. 14, 2020, now Pat. No. 11,196,973, which is a continuation of application No. 16/130,402, filed on Sep. 13, 2018, now Pat. No. 10,757,388.

(52) U.S. Cl.
CPC .............. *G06T 17/00* (2013.01); *G06T 17/05* (2013.01); *A63F 2300/6615* (2013.01); *G06T 2207/10028* (2013.01)

(56) References Cited

U.S. PATENT DOCUMENTS

| | | |
|---|---|---|
| 2010/0259595 A1 | 10/2010 | Trimeche et al. |
| 2013/0321396 A1 | 12/2013 | Kirk et al. |
| 2015/0130916 A1 | 5/2015 | Hamagishi et al. |
| 2016/0330408 A1* | 11/2016 | Costanzo ............ H04N 21/8547 |
| 2017/0142486 A1 | 5/2017 | Masuda |
| 2017/0322017 A1 | 11/2017 | Aoki et al. |
| 2018/0041762 A1 | 2/2018 | Ikai et al. |
| 2019/0394462 A1 | 12/2019 | Miyagoshi et al. |

FOREIGN PATENT DOCUMENTS

| | | |
|---|---|---|
| CN | 106056050 A | 10/2016 |
| JP | H09282249 A | 10/1997 |
| JP | H10198823 A | 7/1998 |
| JP | 2004206338 A | 7/2004 |
| JP | 2013183209 A | 9/2013 |
| JP | 2014086012 | 5/2014 |
| JP | 5563545 B | 7/2014 |
| JP | 2014126906 A | 7/2014 |
| JP | 2016126425 A | 7/2016 |
| JP | 2017139725 A | 8/2017 |

OTHER PUBLICATIONS

Chinese Office Action issued in corresponding CN Application No. 202010169672.0, dated Apr. 16, 2021, pp. 1-23, together with English translation.

Collet et al., "High-Quality Streamable Free-Viewpoint Video," ACM Transactions on Graphics, vol. 34, No. 4, Article 69, Aug. 2015, 69:1-69:13.

Decision to Grant a Patent issued by the Japanese Patent Office on Oct. 9, 2018 in corresponding Japanese Patent Application No. 2017-179010 with English translation.

European Search Report issued in corresponding EP Application No. 20172074.5, dated Sep. 15, 2020, pp. 17.

Extended European Search Report issued by the European Patent Office on Mar. 21, 2019 in corresponding European Patent Application No. 18192401.0.

First Office Action issued by the State Intellectual Property Office of People's Republic of China on Jul. 30, 2019 in corresponding Chinese Patent Application No. 201811074027.X with English translation.

Japanese Office Action corresponding to JP Patent Application No. 2017-179010 dated Jun. 15, 2018.

Kajitani et al., "Point Cloud Streaming for 3D Avatar Communication," I-Tech, Nov. 1, 2008, pp. 372-388.

Lamboray et al., "Dynamic Point Cloud Compression for Free Viewpoint Video," ETH CS Technical Report #430, Dec. 10, 2003, pp. 1-7.

Notification of Reason for Refusal issued by the Korean Intellectual Property Office on Jan. 16, 2020 in corresponding Korean Patent Application No. 10-2018-0111179 with English translation.

Salvador et al., "From Silhouettes to 3D Points to Mesh, Towards Free Viewpoint Video," 3DVP'I0, Oct. 29, 2010, pp. 19-24.

Notifice of Reasons for Refusal issued in corresponding JP Application No. 2021-132062, dated Jul. 19, 2022, pp. 1-6, together with English translation.

Itaru Kitahara et al. "3D Video Display with Motion Parallax in a Large-scale Space" The journal of the Institute of Image Electronics Engineers of Japan (Jul. 25, 2002) pp. 477-486, vol. 31(4), together with English abstract.

Notification of Reason for Refusal issued by the Intellectual Property Office of Korea on Jan. 20, 2022 in corresponding KR Patent Application No. 10-2021-0016229, with translation.

Summons to attend oral proceedings pursuant to Rule 115(1) EPC issued by the European Patent Office on Jun. 26, 2024 in corresponding EP Patent Application No. 20172074.5.

\* cited by examiner

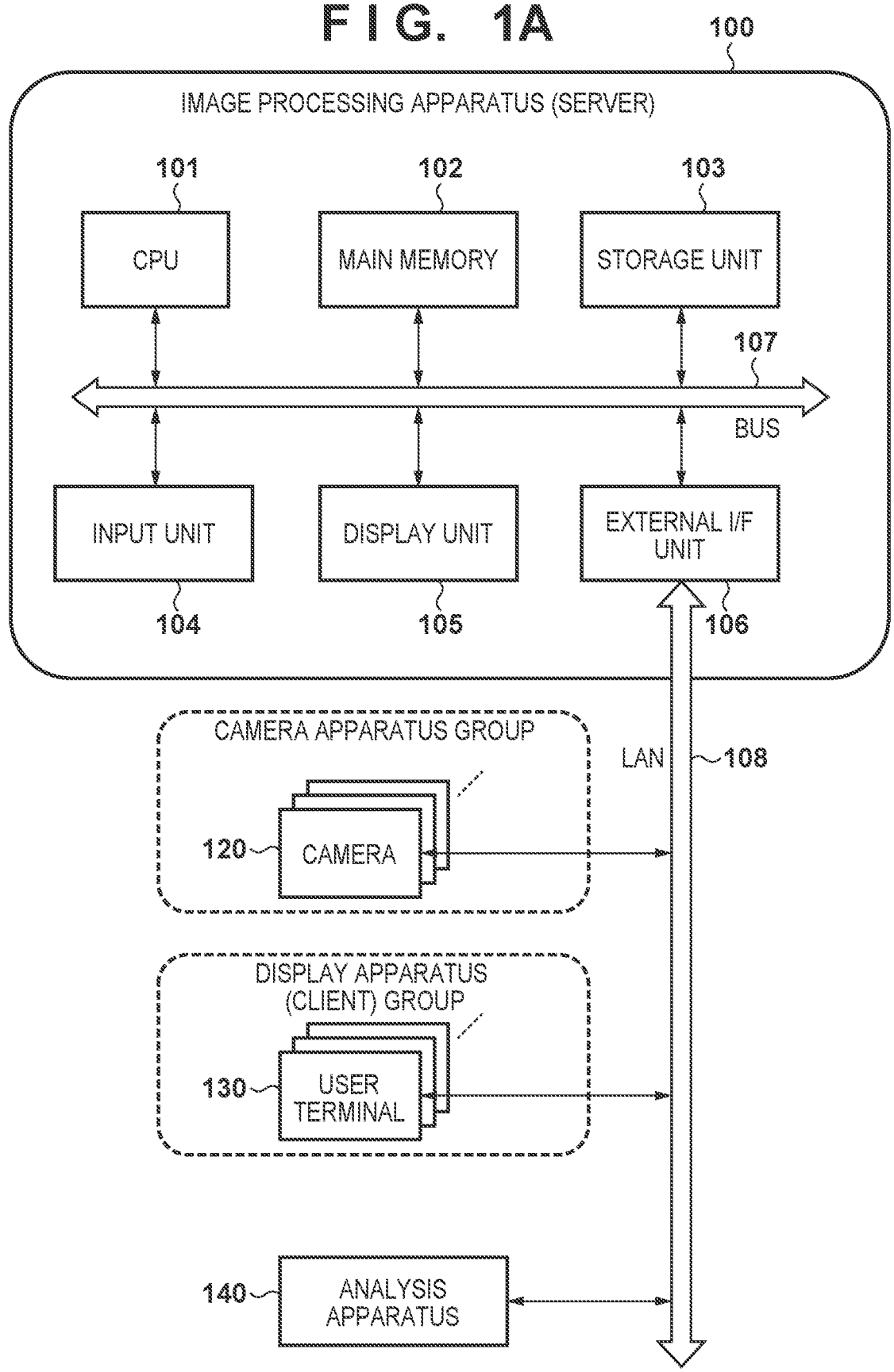

FIG. 5A

|  | FRAME 0 | FRAME 1 | ... | FRAME N |
|---|---|---|---|---|
| CLASS 3 THREE-DIMENSIONAL SHAPE | HIGH-DENSITY POINT CLOUD | | ... | |
| CLASS 3 TEXTURE | ALL VIEWPOINTS INCLUDING OBJECT AND BACKGROUND | ALL VIEWPOINTS INCLUDING OBJECT AND BACKGROUND | ... | ALL VIEWPOINTS INCLUDING OBJECT AND BACKGROUND |
| CLASS 2 THREE-DIMENSIONAL SHAPE | LOW-DENSITY MESH | | ... | |
| CLASS 2 TEXTURE | SINGLE VIEWPOINT OF ONLY OBJECT REGION | SINGLE VIEWPOINT OF ONLY OBJECT REGION | ... | SINGLE VIEWPOINT OF ONLY OBJECT REGION |
| CLASS 1 THREE-DIMENSIONAL SHAPE | LOW-DENSITY MESH | BONE POSITION | ... | |
| CLASS 1 TEXTURE | SINGLE VIEWPOINT OF ONLY OBJECT REGION | NOTHING | ... | NOTHING |

| CLASS | ITEMS THAT CAN BE REPRODUCED |
|---|---|
| CLASS 3 | DETAILED SHAPES, SMOOTH MOVEMENTS, COLORS, WRINKLES, STAINS, SHININESS, CHANGES IN FACIAL EXPRESSION, BACKGROUND DETAILS |
| CLASS 2 | SIMPLE SHAPES, SMOOTH MOVEMENTS, COLORS, WRINKLES, STAINS, CHANGES IN FACIAL EXPRESSION |
| CLASS 1 | SIMPLE SHAPES, COLOR INFORMATION |

FIG. 6A

GAME CATEGORY ATTRIBUTE

| | THREE-DIMENSIONAL SHAPE | TEXTURE | REQUIRED CLASS |
|---|---|---|---|
| AMERICAN FOOTBALL | CLASS 1 OR HIGHER (POSITIONS ARE IMPORTANT) | CLASS 1 OR HIGHER (FACES ARE NOT VISIBLE) | CLASS 1 |
| SOCCER | CLASS 1 OR HIGHER (POSITIONS ARE IMPORTANT) | CLASS 2 OR HIGHER (FACIAL EXPRESSIONS NEED TO BE SEEN) | CLASS 2 |
| FIGURE SKATING | CLASS 2 OR HIGHER (MOVEMENTS ARE IMPORTANT) | CLASS 3 OR HIGHER (FACIAL EXPRESSIONS NEED TO BE SEEN) | CLASS 3 |

FIG. 6B

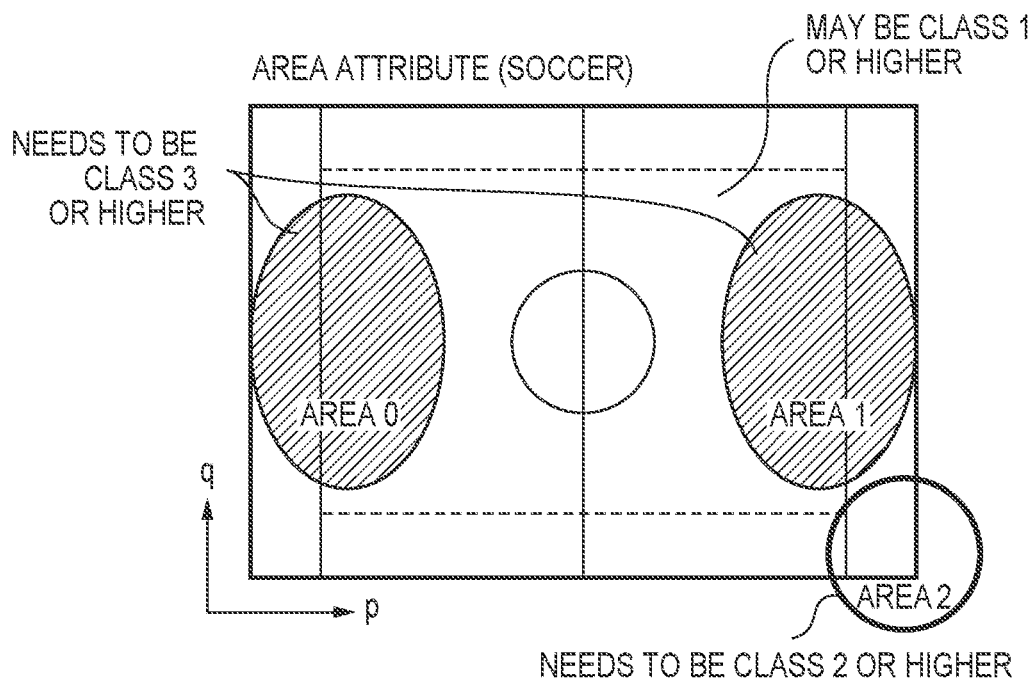

FIG. 6C

| | REGION | REQUIRED CLASS |
|---|---|---|
| AREA 0 | (x0,y0)~(x1,y1) | CLASS 3 |
| AREA 1 | (x2,y2)~(x3,y3) | CLASS 3 |
| AREA 2 | (x4,y4)~(x5,y5) | CLASS 2 |
| OTHER | REGIONS OTHER THAN AREAS 0, 1, AND 2 | CLASS 1 |

FIG. 6D

GAME ATTRIBUTE (SOCCER)

| | REGION | TIME CODE | REQUIRED CLASS |
|---|---|---|---|
| AREA 0 | (x0,y0)~(x1,y1) | 312~602,1005~1221 | CLASS 3 |
| | | OTHER TIME CODES | CLASS 1 |
| AREA 1 | (x2,y2)~(x3,y3) | | CLASS 3 |
| AREA 2 | (x4,y4)~(x5,y5) | 1509~1666,2024~2132 | CLASS 2 |
| | | OTHER TIME CODES | CLASS 1 |
| OTHER | REGIONS OTHER THAN AREAS 0, 1, AND 2 | | CLASS 1 |

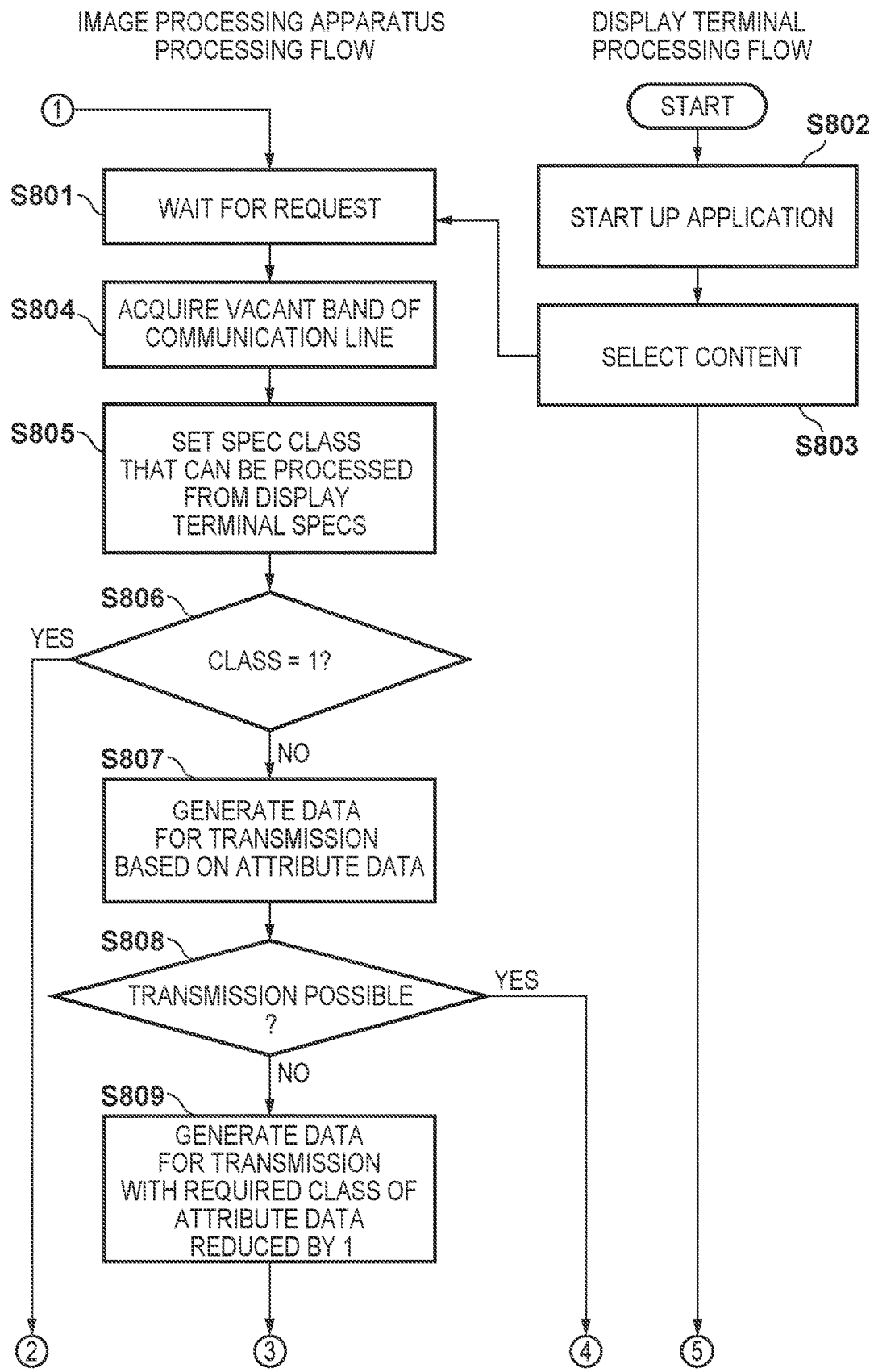

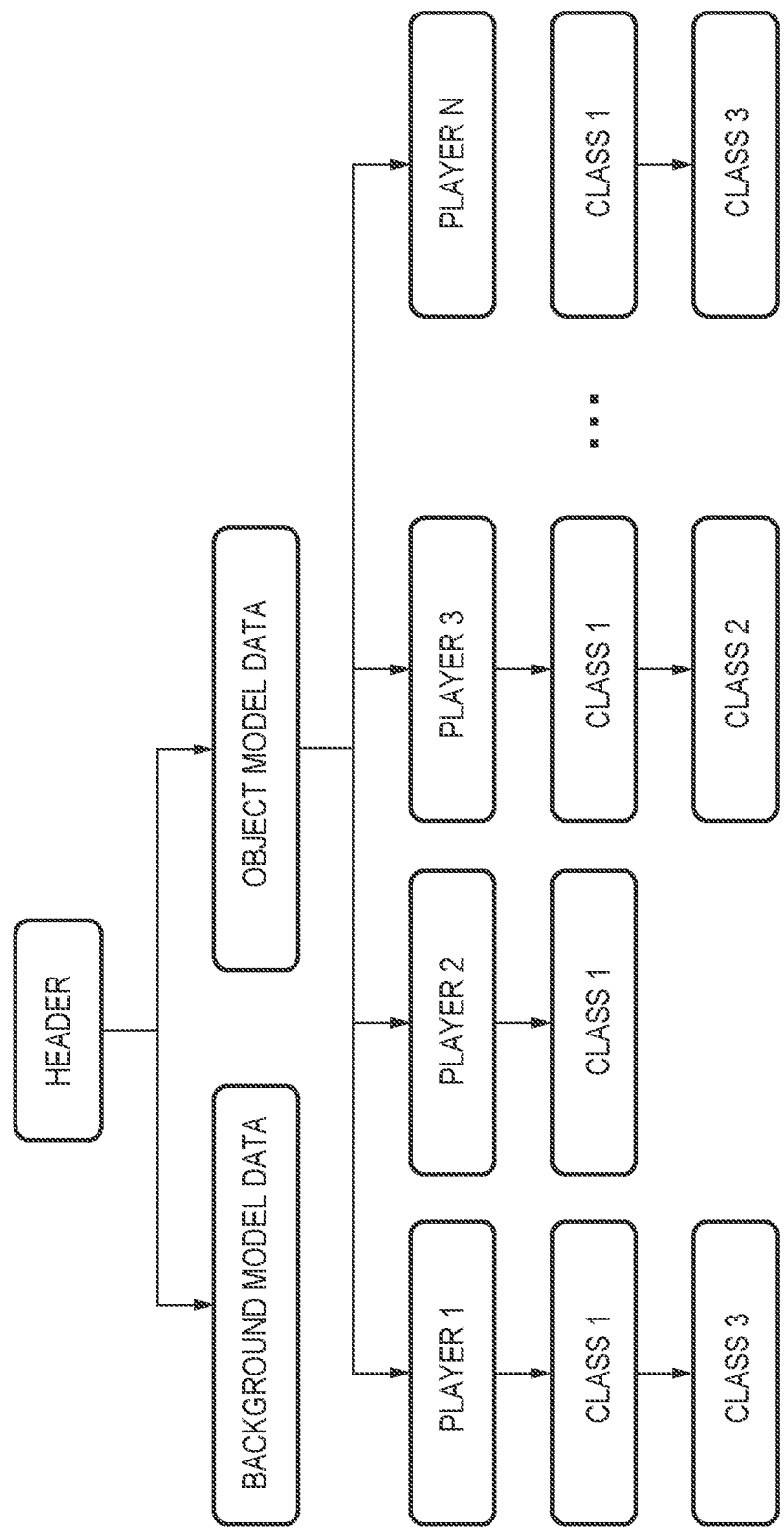

VIRTUAL CAMERA POSITION AT TIME CODE M

| | REQUIRED CLASS | IN ANGLE OF VIEW | DISTANCE FROM CAMERA | S1301 | S1303 |
|---|---|---|---|---|---|
| PLAYER 1 | CLASS 2 | × | 7m | CLASS 2 | CLASS 2 |
| PLAYER 2 | CLASS 3 | ○ | 20m | CLASS 2 | CLASS 1 |
| ... | ... | ... | ... | ... | ... |
| PLAYER N | CLASS 1 | △ | 8m | CLASS 3 | CLASS 3 |

PROVIDING APPARATUS, PROVIDING METHOD AND COMPUTER READABLE STORAGE MEDIUM FOR PERFORMING PROCESSING RELATING TO A VIRTUAL VIEWPOINT IMAGE

CROSS REFERENCE TO RELATED APPLICATIONS

This application is a continuation of U.S. patent application Ser. No. 17/517,055, filed on Nov. 2, 2021, which is a continuation of U.S. patent application Ser. No. 16/928,503, filed on Jul. 14, 2020, which is a continuation of U.S. patent application Ser. No. 16/130,402, filed on Sep. 13, 2018, which claims the benefit of and priority to Japanese Patent Application No. 2017-179010, filed on Sep. 19, 2017, each of which is hereby incorporated by reference herein in their entirety.

BACKGROUND OF THE INVENTION

Field of the Invention

The present invention relates to a providing apparatus and a providing method for performing processing relating to a virtual viewpoint image, and a computer readable storage medium.

Description of the Related Art

A free viewpoint image (virtual viewpoint image) technique is an example of a technique for reproducing an image from a virtual camera disposed at any position in a three-dimensional space using multiple real camera images. With the virtual viewpoint image technique, an image taken from any virtual camera position is generated by estimating the three-dimensional shapes of objects. By transmitting model data (three-dimensional shapes and texture images) of the objects to a terminal of a user, a virtual viewpoint image corresponding to an interactive operation performed by the user can be generated. However, since the data amount of the model data of an object is large, the transmission of the model data puts pressure on the communication band. Japanese Patent No. 5563545 proposes a configuration in which the configuration density of the three-dimensional shapes is varied according to the amount of change in the shapes as a method for reducing the amount of data to be transmitted.

However, Japanese Patent No. 5563545 focuses only on the configuration density of shapes, and therefore there is a risk that information that is necessary for the user will be omitted. Accordingly, the means for reducing the amount of data disclosed in Japanese Patent No. 5563545 is not suitable for generating model data for generating a virtual viewpoint image.

SUMMARY OF THE INVENTION

An embodiment of the present invention discloses a providing apparatus and a providing method for providing three-dimensional geometric data, according to which the data amount of model data for regenerating a virtual viewpoint image can be efficiently reduced.

According to one aspect of the present invention, there is provided a providing apparatus configured to provide three-dimensional geometric data to be used to generate a virtual viewpoint image, the providing apparatus comprising: a hardware processor; and a memory storing one or more programs configured to be executed by the hardware processor, the one or more programs including instructions for: receiving a data request from a communication apparatus; deciding which of a plurality of pieces of three-dimensional geometric data including first three-dimensional geometric data and second three-dimensional geometric data with a different quality than the first three-dimensional geometric data is to be provided to the communication apparatus from which the received data request was transmitted; and providing the three-dimensional geometric data decided on from among the plurality of pieces of three-dimensional geometric data, to the communication apparatus as a response to the received data request.

According to another aspect of the present invention, there is provided a providing method for providing three-dimensional geometric data to be used to generate a virtual viewpoint image, the providing method comprising: receiving a data request from a communication apparatus: deciding which of a plurality of pieces of three-dimensional geometric data including first three-dimensional geometric data and second three-dimensional geometric data with a different quality than the first three-dimensional geometric data is to be provided to the communication apparatus from which the received data request was transmitted; and providing the three-dimensional geometric data decided on from among the plurality of pieces of three-dimensional geometric data, to the communication apparatus as a response to the received data request.

Furthermore, according to another aspect of the present invention, there is provided a non-transitory computer readable storage medium storing a program for causing a computer to execute a providing method for providing three-dimensional geometric data to be used to generate a virtual viewpoint image, the providing method comprising: receiving a data request from a communication apparatus: deciding which of a plurality of pieces of three-dimensional geometric data including first three-dimensional geometric data and second three-dimensional geometric data with a different quality than the first three-dimensional geometric data is to be provided to the communication apparatus from which the received data request was transmitted; and providing the three-dimensional geometric data decided on from among the plurality of pieces of three-dimensional geometric data, to the communication apparatus as a response to the received data request.

Further features of the present invention will become apparent from the following description of exemplary embodiments (with reference to the attached drawings).

BRIEF DESCRIPTION OF THE DRAWINGS

FIG. 1A is a block diagram showing a configuration of an image display system and a configuration of an image processing apparatus.

FIGS. 5A to 5C are diagrams showing overviews of class model data.

FIGS. 6A to 6D are diagrams showing overviews of attribute data.

FIGS. 8A and 8B are flowcharts showing model data transmission processing.

FIGS. 11A and 11B are diagrams showing data for transmission.

DESCRIPTION OF THE EMBODIMENTS

Figure 1B:
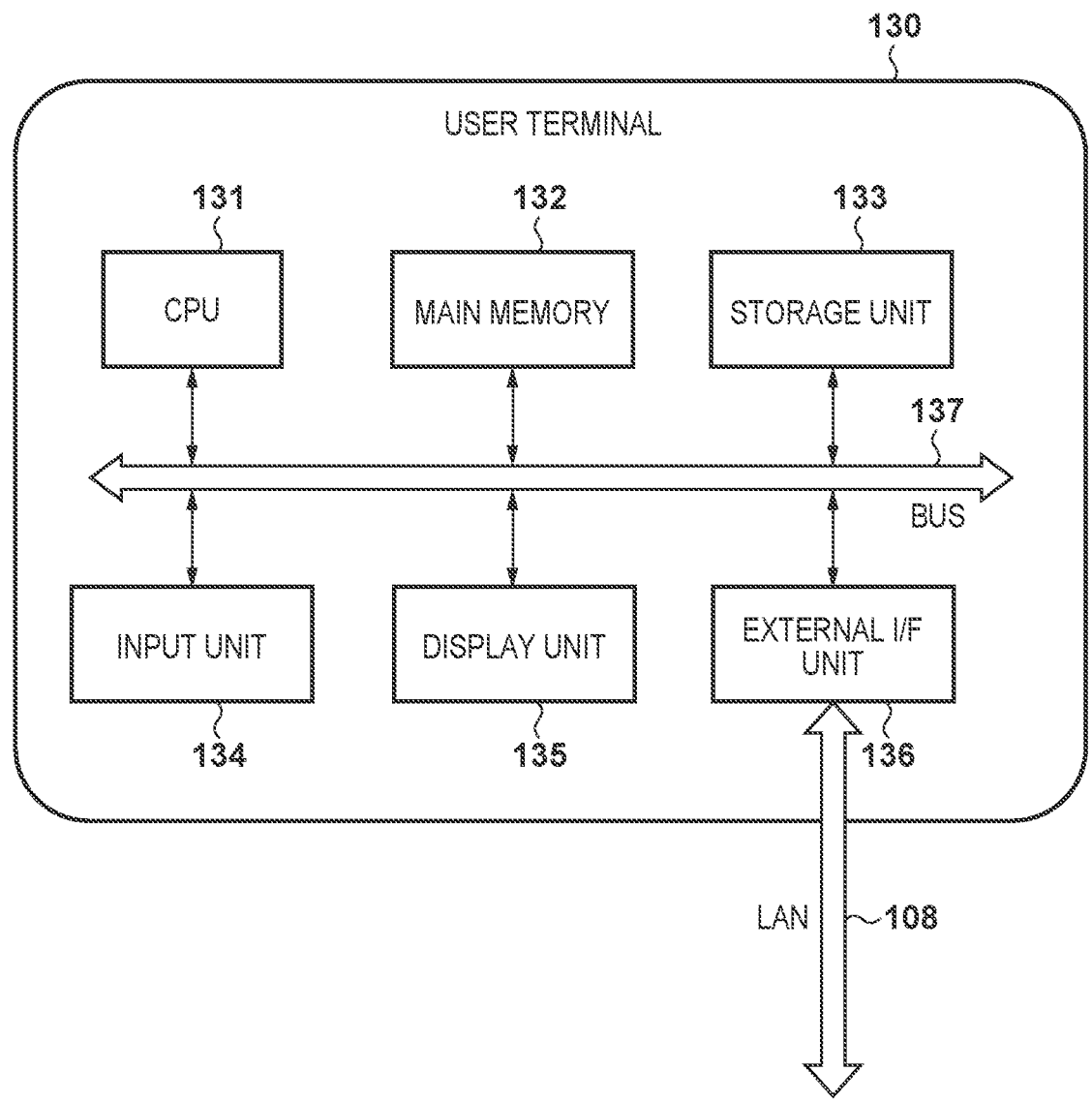
FIG. 1B is a block diagram showing a configuration of a display apparatus.

Hereinafter, an embodiment of the present invention will be described with reference to the drawings. Note that the following embodiment does not limit the present invention, and not all combinations of features described in the present embodiment are essential in the solving means of the present invention. Note that identical configurations are denoted by identical reference signs in the description.

First Embodiment

In the first embodiment, a method for transmitting model data that is needed when regenerating an interactive virtual viewpoint image in a user terminal will be described. Here, in order to simplify the description, a case is envisioned in which there is one server, which is a transmission source, and there are multiple clients, which are reception destinations. The location is set inside of a stadium in which a soccer game is held, an image processing apparatus, which is a server, is present in the stadium, and in a spectator seat, a user operates a display apparatus (a terminal such as a smartphone or a tablet), which is a client, to browse a virtual viewpoint image. Note that in the present embodiment, a virtual viewpoint image means an image viewed from a viewpoint that is set virtually. Terms such as "free viewpoint image" and "arbitrary viewpoint image" are also similar to "virtual viewpoint image".

FIG. 1A is a block diagram showing an example of a configuration of an image processing apparatus and an example of a configuration of an image display system, according to a first embodiment. An image processing apparatus 100 serving as a providing apparatus provides three-dimensional geometric data and texture data to be used to generate a virtual viewpoint image to a communication apparatus (in the present embodiment, a user terminal 130 (display apparatus) that has given a data request. The image processing apparatus 100 includes a CPU 101, a main memory 102, a storage unit 103, an input unit 104, a display unit 105, an external I/F unit 106, and a bus 107. The CPU 101 executes arithmetic processing and various programs. The main memory 102 provides the CPU 101 with programs, data, a work region, and the like, which are needed for processing. The storage unit 103 stores an image processing program, various types of data needed for a GUI display, and the like. A non-volatile memory such as a hard disk or a silicon disk, for example, is used as the storage unit 103. The input unit 104 is an apparatus such as a keyboard or a mouse, and receives operation input from a server manager. The display unit 105 performs display of a GUI. The external I/F unit 106 is connected to a camera apparatus group or a display apparatus group via a LAN 108 and performs transmission and reception of image data, control signal data, and model data. A bus 107 connects the above-described units and performs data transfer.

A LAN 108 is formed with wires or wirelessly, and is used for data transmission and reception between an image processing apparatus, a camera apparatus group, a display apparatus group, and an analysis apparatus. The camera apparatus group is constituted by multiple cameras 120. The cameras 120 are connected to an image processing apparatus 100 via the LAN 108, and based on control signals from the image processing apparatus 100, the cameras 120 start and stop image capture, change camera settings (shutter speed, focal distance, diaphragm value, etc.), and transfer image capture data. The display apparatus group is constituted by multiple user terminals 130 (smartphones, tablets, etc.). Each user terminal 130 is connected to the image processing apparatus 100 via the LAN 108, and receives model data that is needed for browsing a virtual viewpoint image from the image processing apparatus 100. The user terminal 130 uses the received model data to generate and display a virtual viewpoint image. Since the communication band of the LAN 108 is limited, the size of the model data that can be received by the user terminal 130 depends on the number of users. The analysis apparatus 140 analyzes the type of play of the object using the images from the cameras 120 and various types of information from sensors provided on the objects. Note that the analysis apparatus 140 is optional and is not an essential constituent component. Note that various constituent components other than those described above are present in the system configuration. For example, various devices may be connected via the Internet, a WAN, or the like instead of the LAN 108. Also, for example, the image processing system may be formed due to the image processing apparatus 100, the multiple cameras 120, and the analysis apparatus 140 being connected via the LAN 108, and the image processing system and the user terminal 130 may be connected through the Internet or the like.

FIG. 1B is a block diagram showing a configuration of a user terminal 130 serving as a display apparatus, according to a first embodiment. The user terminal 130 includes a CPU 131, a main memory 132, a storage unit 133, an input unit 134, a display unit 135, an external I/F unit 136, and a bus 137. The CPU 131 executes arithmetic processing and various programs. The main memory 132 provides the CPU 131 with programs, data, a work region, and the like, which are needed for processing. The storage unit 133 stores an image processing program for generating and displaying a virtual viewpoint image, various types of data needed for a GUI display, and the like. A non-volatile memory such as a hard disk or a silicon disk, for example, is used as the storage unit 133. The input unit 134 is an apparatus such as keyboard, a mouse, or a touch panel, and receives operation input from a user observing a virtual viewpoint image. The display unit 135 displays a virtual viewpoint image and a GUI. The external I/F unit 136 is connected to the LAN 108 and receives model data for regenerating a virtual viewpoint image, the model data being transmitted from the image processing apparatus 100, for example. A bus 137 connects the above-described units and performs data transfer.

Figure 2:
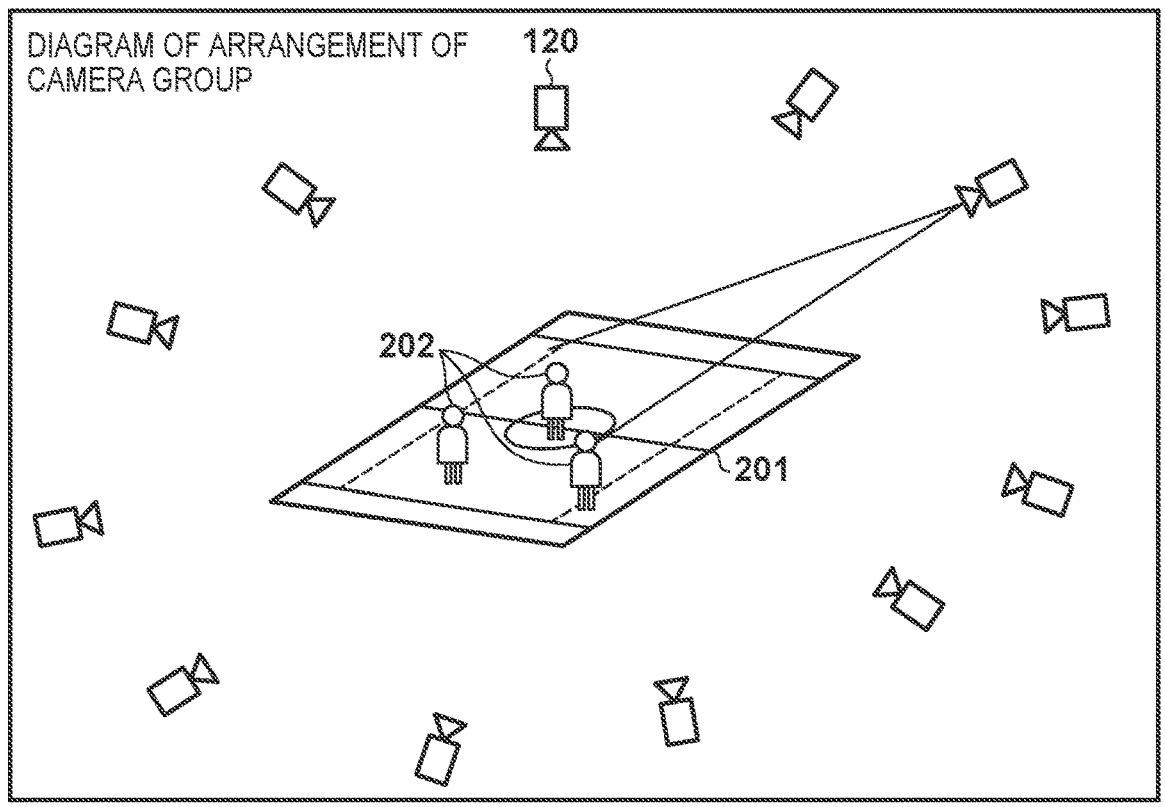
FIG. 2 is a schematic diagram showing an arrangement of cameras in the image display system.

FIG. 2 is a diagram showing an arrangement of the multiple cameras 120. Multiple objects 202 are present on a field 201 on which a soccer game is played, and the multiple cameras 120 are arranged so as to surround the field 201. The multiple cameras 120 are arranged mainly in the spectator seats or the like, and the focal lengths and image capture directions are set such that each camera 120 captures the field 201.

Figure 3:
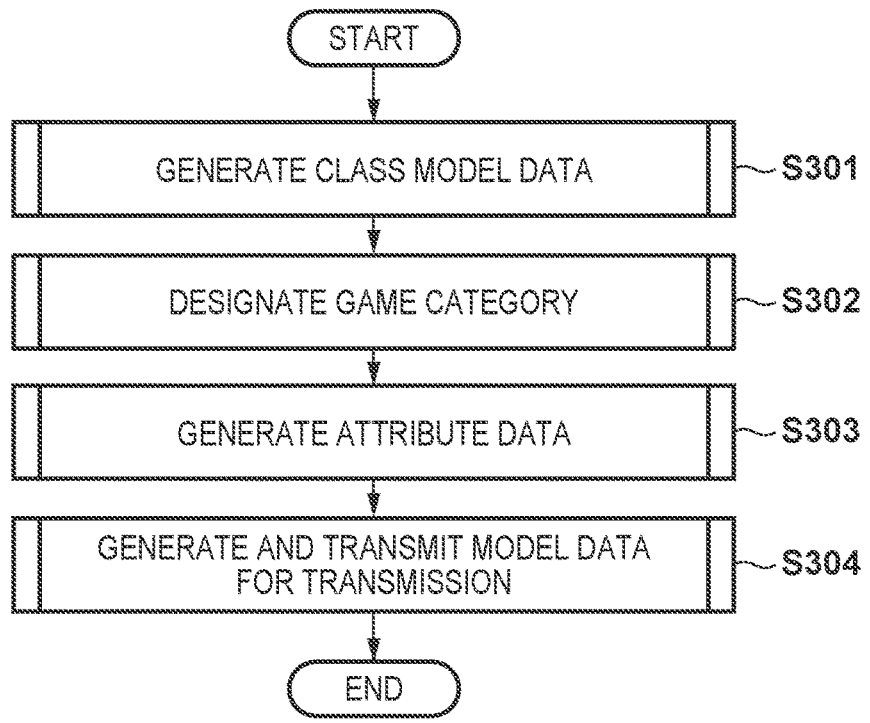
FIG. 3 is a flowchart showing processing for transmitting a virtual viewpoint image.

FIG. 3 is a flowchart showing a series of processes performed by the image processing apparatus 100 for providing three-dimensional geometric data and texture data. In step S301, the image processing apparatus 100 acquires an image obtained through image capture by a camera 120 and generates model data of multiple classes (described in detail in FIG. 5A) with different data sizes for each object in the image. The processing of step S301 will be described in detail with reference to FIG. 4. In step S302, the image processing apparatus 100 receives a designation of a game category to be subjected to image capture. Here, designation of a game category name such as "soccer", "rugby", or "figure skating" is received. In step S303, based on the type of the game received in step S302 and the data from the analysis apparatus 140, the image processing apparatus 100 generates attribute data describing the class of the model data needed for virtual viewpoint image generation. As described later with reference to FIGS. 6A to 6D, the attribute data is data that associates an attribute of a piece of content in the image and a required class. The processing of step S303 will be described later with reference to FIG. 7. In step S304, the image processing apparatus 100 forms model data for transmission by selecting model data of the class required by the attribute data for each object, and transmits the model data for transmission in response to a request from a user terminal 130, which is a display apparatus. In the construction of the model data for transmission, the usage state of the communication band of the LAN 108 and the like are also considered. The processing of step S304 will be described later with reference to FIGS. 8A and 8B.

Figure 4:
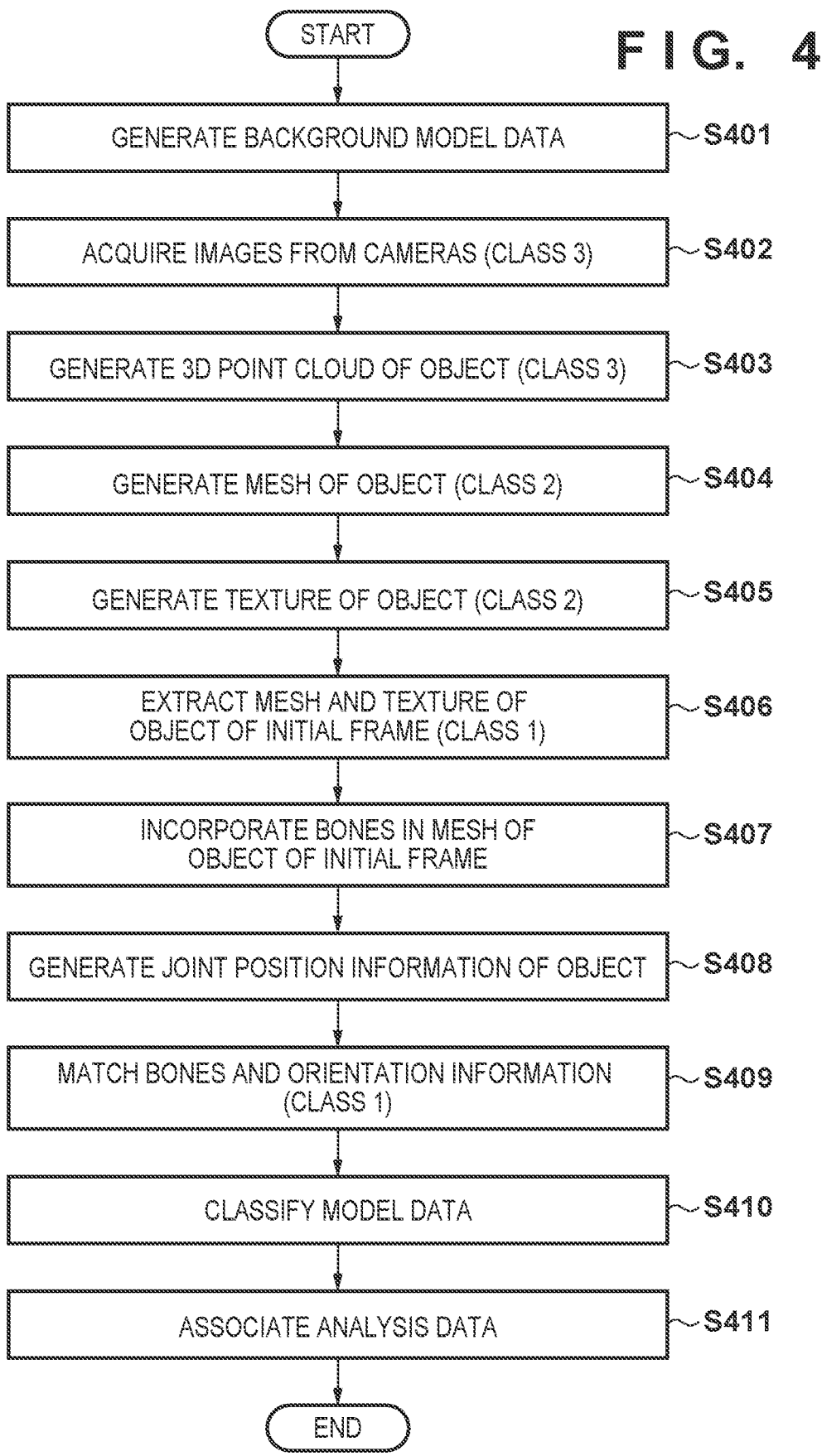
FIG. 4 is a flowchart showing processing for generating class model data.

FIG. 4 is a flowchart showing processing for generating the model data needed to generate an interactive virtual viewpoint image with multiple classes, and shows the processing of step S301 in detail. In step S401, the image processing apparatus 100 (CPU 101) generates background model data such as the stadium and the spectator seats. The background model data includes background geometric data indicating the three-dimensional shape of the region other than specific objects such as players, and texture data corresponding to the background geometric data. For example, the background model data is constituted by mesh data for constructing three-dimensional shapes and texture data for reproducing colors, and is generated using a 3D laser scanner, a multi-view stereo method, or the like.

In step S402 and onward, object geometric data indicating the three-dimensional shapes of specific objects such as players and texture data corresponding to the object geometric data is generated in multiple classes with different qualities. In step S402, the CPU 101 transmits a change in the camera settings for making light exposure during image capture suitable, and a signal for starting image capture to the cameras 120. In response to the signal for starting image capture, the cameras 120 start image capture and transfer the image data to the image processing apparatus 100 via the LAN 108. The image processing apparatus 100 receives the image data from the cameras 120 and deploys it to the main memory 102. The image processing apparatus 100 manages the image data as multi-viewpoint frames obtained by consolidating the image frames of the cameras for each identical time code. Also, at this time, the image processing apparatus 100 calculates the positions and orientations of the cameras using a method such as Structure from Motion and stores the positions and orientations of the cameras.

In step S403, the CPU 101 extracts the outlines of a group of objects serving as specific objects from the image data and generates the three-dimensional shapes and positions of the group of objects using a method such as Visual-hull. The outline extraction of the object group can be acquired by using an intermediate value filter in all frames of a camera image of one camera. Also, the three-dimensional shape is output as point cloud data or voxel data. This processing is carried out on multi-viewpoint frames of all time codes, and geometric point cloud data (geometric data expressed using a high-density point cloud) of all objects is generated in units of multi-viewpoint frames. The generated geometric point cloud data is stored in the storage unit 103.

In step S404, the CPU 101 thins out the geometric point cloud data generated in step S403, connects the remaining point clouds to form meshes constituting surfaces (triangular polygons), and thus generates meshes indicating the objects. A known technique can be applied in the mesh formation, and for example, a method such as Ball Pivoting can be used. The CPU 101 executes mesh formation processing on all of the geometric point cloud data generated in units of multi-viewpoint frames and stores the obtained data (low-density mesh data) in the storage unit 103. In step S405, the CPU 101 generates texture data (textures of objects) to be attached to the meshes generated in step S404. A known technique can be applied to the generation of the textures of the objects. The CPU 101 generates the textures for all of the mesh data generated in units of multi-viewpoint frames and stores the obtained data in the storage unit 103.

Figures 5B, 5C:
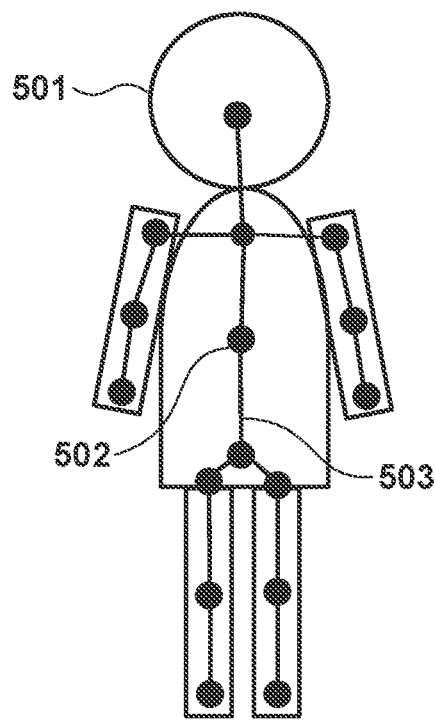

In step S406, the CPU 101 reads out the meshes and the textures generated from the multi-viewpoint frame (initial frame) corresponding to the first time code of the image from the storage unit 103 and expands them to the main memory 102. In step S407, the CPU 101 incorporates bones for controlling the orientations of the meshes in the meshes loaded in step S406. As shown in FIG. 5C, the bones have a structure like that of the bones of a human, include joints 502 and a framework 503 that connects the joints 502, and are stored inside of the mesh 501. The bones are prepared in advance and can be stored in various meshes by changing the size and initial joint positions to fit the mesh. Since the meshes 501 and the bones deform in an interlinked manner, it is possible to reproduce various orientations and operations (sitting, running, kicking, etc.) in the meshes 501 by moving the positions of the joints 502. Also, since the movement of the position of each joint 502 is restricted by the framework 503, operations more similar to those performed by a human can be reproduced.

In step S408, the CPU 101 estimates the joint positions of all of the objects using the camera images. A known technique can be applied in the estimation of the joint positions. For example, the joint positions $(x(n,i,k,t), y(n,i,k,t))$ in two dimensions in the images are acquired using machine learning. Here, $0 \leq x <$ horizontal width of image, $0 \leq y <$ vertical width of image, $0 \leq n <$ number of cameras, $0 \leq i <$ number of objects, $0 \leq k <$ number of joints, and $0 \leq t <$ number of frames. After the two-dimensional joint positions are acquired in the images of at least two or more cameras, joint positions $(X(i,k,t), Y(i,k,t), Z(i,k,t))$ in three dimensions are acquired using triangulation based on the positions of the cameras obtained in step S402. At this time, X, Y, and Z are coordinate values in a three-dimensional space, $0 \leq i <$ number of objects, $0 \leq k <$ number of joints, and $0 \leq t <$ number of frames. Accordingly, the movement paths of the joints of the objects, that is, the transitions of the orientations are acquired.

In step S409, the CPU 101 associates the joint positions of the bones generated in step S407 with the three-dimensional joint positions generated in step S408 in units of multi-viewpoint frames, and thus causes a transition in the orientations of (animates) the meshes and bones. Accordingly, with the meshes and textures, only the data of the multi-viewpoint frame at the start of the image need be prepared, and a small amount of animation data indicating the paths of the joint positions need only be added, and therefore the model data is substantially compressed in the time axis direction, and the amount of data can be significantly reduced.

In step S410, the CPU 101 holds the model data generated in steps S403 to S409 as the class structure indicated in Table 5a of FIG. 5A. In Table 5a, the classes are divided into three levels, each level including three-dimensional shapes and textures. Class 3 is the highest class, includes the point cloud data generated in step S403 as the three-dimensional shape and camera images acquired in step S402 as the texture, has the largest amount of data, and has the highest image quality of the generated virtual viewpoint images. Class 2 includes the mesh data generated in step S404 as the three-dimensional shape and the texture data generated in step S405 as the texture, and has an intermediate amount of data and an intermediate image quality of the generated virtual viewpoint image. In the present embodiment, class 1 is the lowest class, includes the mesh data acquired in step S406 and the animation data acquired in step S409 as the three-dimensional shape, and includes the texture data acquired in step S406 as the texture. The model data of class 1 has the lightest amount of data and the image quality of the virtual viewpoint image is the lowest. Thus, each class has a different quality and amount of data from the other classes. Items that can be reproduced for each class are summarized in Table 5b of FIG. 5B. As the class gets lower, the items that can be expressed decrease in number, and therefore it is necessary to select the appropriate class according to the content during data transmission.

In step S411, if the analysis apparatus 140 is present, the CPU 101 associates the model data with play information (play content such as shooting, passing, clearance) of the objects, which is the analysis data obtained from the analysis apparatus 140. Accordingly, for example, it is possible to carry out processing and the like for extracting three-dimensional geometric data and texture data of a desired class during shooting. According to the above-described processing, the generation of model data having a class structure is complete.

FIGS. 6A to 6D are diagrams illustrating attribute data that is needed to compress the model data. In the present embodiment, in the attribute data, there are three types of attributes, namely a game category attribute, an area attribute, and a game attribute, and the compression effect is the strongest for the game attribute, second-strongest for the area attribute, and weakest for the game category attribute. The class (required class) of the model data required for virtual viewpoint image generation is described in each piece of attribute data, and the required classes are categorized with the lowest precision for the game category attribute, the second-highest precision for the area attribute, and the highest precision for the game attribute.

The required classes are described in the game category attribute for each type of game serving as an attribute of the content, as shown in Table 6a of FIG. 6A. For example, in American football, the players wear helmets and their faces are hidden, and therefore the required class for the textures is low. On the other hand, in figure skating and soccer, the faces and expressions of the players need to be seen clearly, and therefore the required class for the textures is high. Also, in American football and soccer, the play positions of the players are important and there is little need for detailed shapes and smooth movements, and therefore the required class for the three-dimensional shapes is low. On the other hand, in figure skating, since the movement during the performance is important, the required class for the three-dimensional shape is high. Thus, the required classes are decided for the three-dimensional shapes and textures in each game category, and the highest required class is defined as the required class for that game category.

Regarding the area attribute, as shown in Table 6c in FIG. 6C, the required classes are described for each area (part of a game location) serving as an attribute of content for the game location of each game category. For example, with soccer, as shown in FIG. 6B, areas 0 and 1, which are in front of the goals, have a high occurrence of plays that receive attention, and therefore the required class therefor is the highest. Area 2, in which a corner kick or the like occurs, has the next-highest required class, and the required classes of the regions other than areas 0, 1, and 2 are low. Note that area 2 is only shown at one location in FIG. 6B, but in actuality, areas 2 are set in the four corners of the field. In view of the foregoing description, the region information of the areas and the required classes corresponding thereto are described as shown in Table 6c in FIG. 6C, and this is used as the area attribute for soccer. On the other hand, in a game category in which it is not possible to narrow down the region in which the object will perform a play that is to be given attention, as with figure skating, the area attribute is not defined.

With the game attribute, as shown in Table 6d of FIG. 6D, the areas and time codes are used as attributes of the content, and the required classes are described for each area and time code. For example, in the case of soccer, from the analysis apparatus 140, it is possible to acquire the time code at which a play (shooting, etc.) occurred. For this reason, it is possible to increase the compression efficiency through processing such as making the required class higher at the time code (period) in which a play with a high attention level occurred and lowering the required class at other time codes. Note that the analysis apparatus 140 is essential for the generation of the game attribute, and therefore if the analysis apparatus 140 is not connected, the game attribute cannot be defined.

Figure 7:
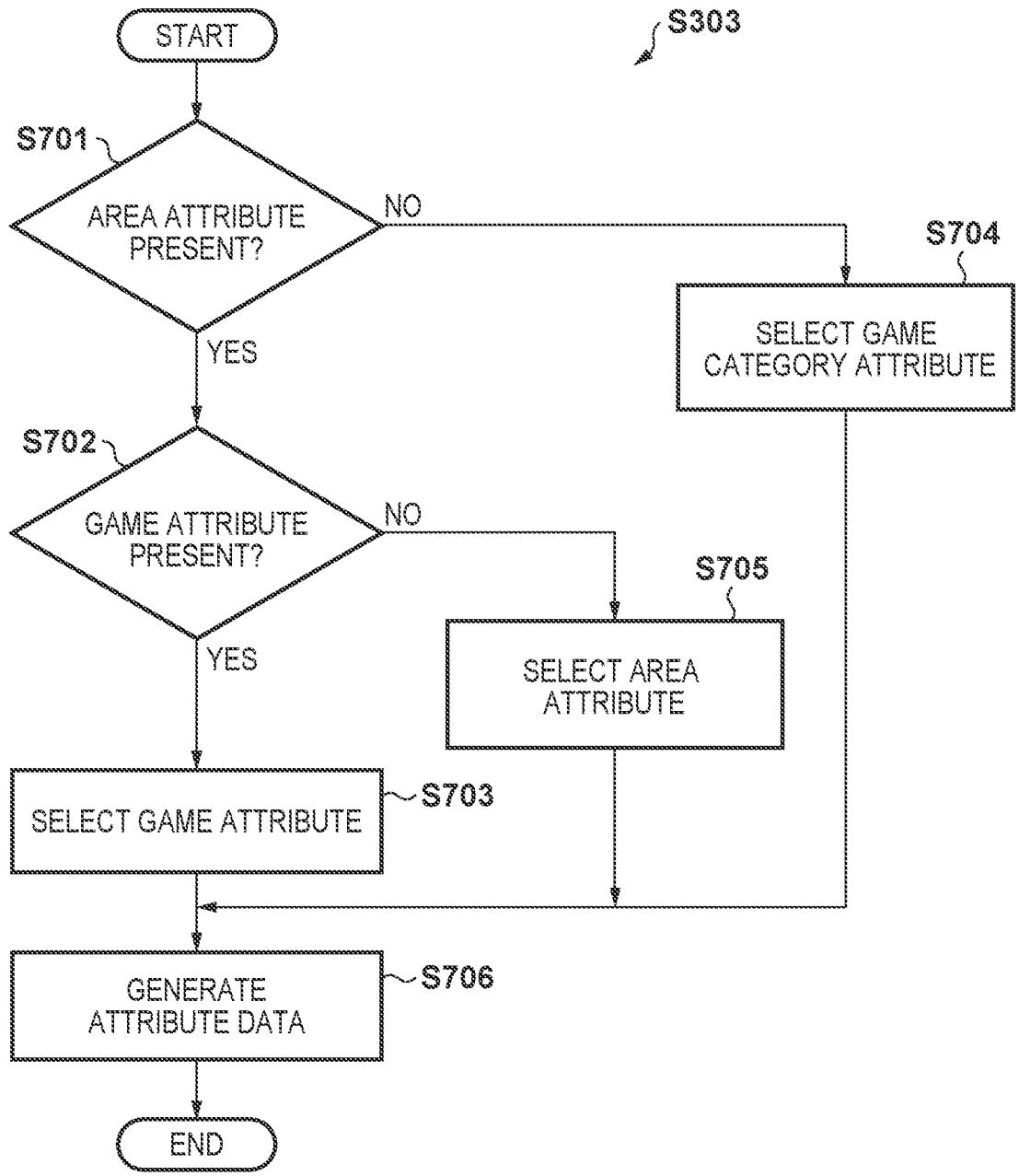
FIG. 7 is a flowchart showing processing for generating attribute data.

FIG. 7 is a flowchart showing processing for generating attribute data and shows the processing of step S303 in detail. In step S701, the CPU 101 determines whether or not the area attribute is defined in the content. If the result of the determination is YES, the processing advances to step S702, and if the result of the determination is NO, the processing advances to step S704. In step S702, the CPU 101 determines whether or not the game attribute is defined in the content. If the result of the determination is YES, the processing advances to step S703, and if the result of the determination is NO, the processing advances to step S705. If the game attribute is present (YES in steps S701 and S702), in step S703, the CPU 101 selects the game attribute as the attribute data. If no area attribute is present (NO in step S701), in step S704, the CPU 101 selects the game category attribute as the attribute data. If the area attribute is present but the game attribute is not (YES in step S701, NO in step S702), in step S705, the CPU 101 selects the area attribute as the attribute data. In step S706, the CPU 101 generates attribute data such as that shown in Tables 6a, 6c, or 6d, shown in FIGS. 6A to 6D, based on the selected attribute. For example, if coordinates (e.g., (x0,y0) to (x1, y1), etc.) indicating the ranges of the areas 0, 1, and 2 are defined as the area attribute in the content, the CPU 101 generates the attribute data shown in Table 6c using the coordinates. Also, if the time code at which a play with a high attention level occurred is included along with the area attribute in the content, the CPU 101 generates the attribute data shown in Table 6d.

Figure 8B:
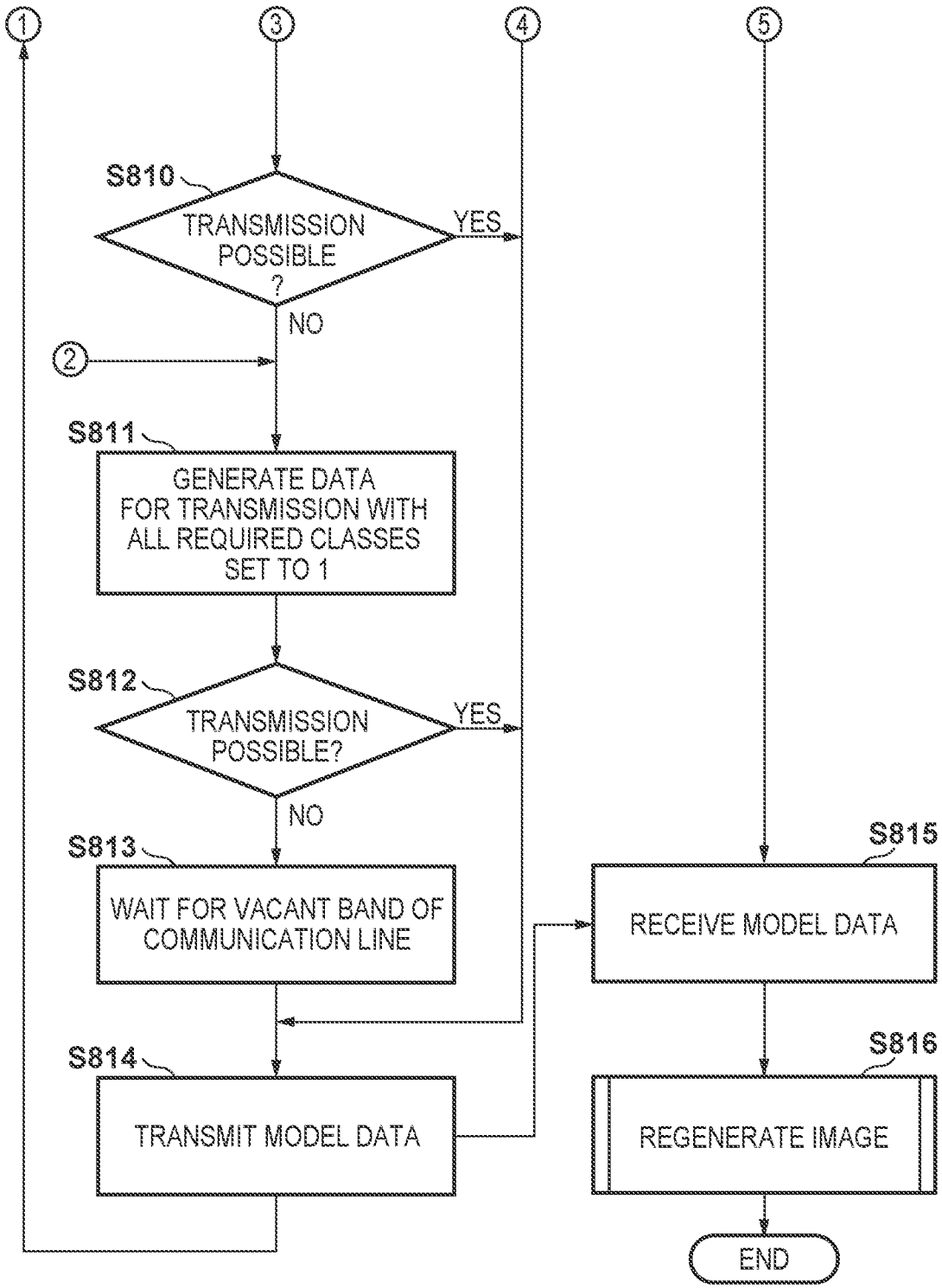
Figure 9A:
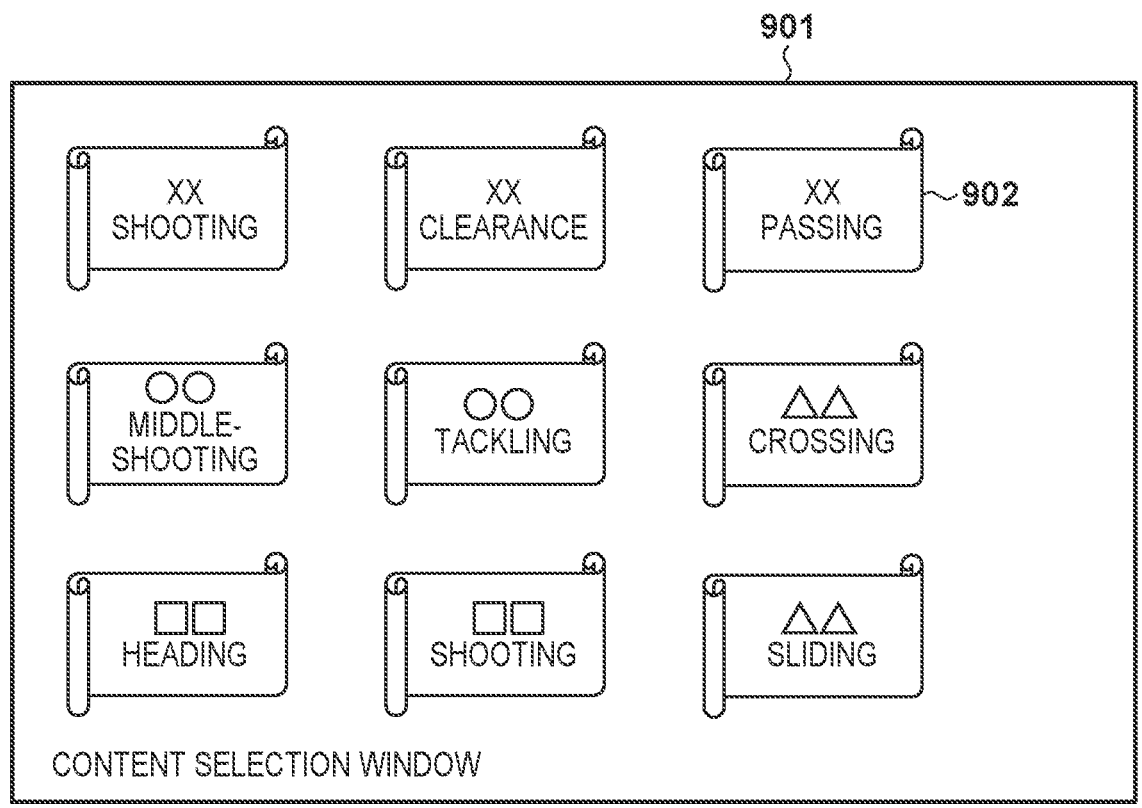
FIGS. 9A and 9B are diagrams showing a GUI of a display apparatus.

FIGS. 8A and 8B are flowcharts showing processing for transmitting the model data to the display apparatus, and shows step S304 in detail. In step S801, the CPU 101 puts the image processing apparatus 100, which is a server, in a state of waiting for a request from a display apparatus (user terminal 130), which is a client. In step S802, the user terminal 130 (CPU 131) starts up an application for image regeneration in response to a predetermined operation on the user terminal 130 performed by the user, who is a viewer of the virtual viewpoint image. In step S803, the user terminal 130 (CPU 131) selects the content that the user wants to view. The application is used to select the content. After the application for image regeneration is started up, the user terminal 130 (CPU 131) displays a content selection window 901 as shown in FIG. 9A on the display unit 135. The user can select a desired piece of content by touching a desired icon 902. When the piece of content is selected, the user terminal 130 (CPU 131) transmits a data request (request) for downloading the model data to the image processing apparatus 100. At this time, the user terminal 130 (CPU 131) also transmits the display resolution of the display apparatus (display unit 135) of the user terminal 130 and spec information of the CPU 131 and the GPU to the image processing apparatus 100.

Note that in order to display the content selection window 901, the user terminal 130 acquires a list of pieces of content to be selected from the image processing apparatus 100. Each piece of content in the list corresponds to a group of multi-viewpoint frames that are temporally continuous. For example, based on the play content (analysis result of the analysis apparatus 140), one piece of content may be generated using a series of multi-viewpoint frames including time codes close to that at which the play occurred. For example, as described in step S411, the model data associated with each piece of play information may be used as one piece of content. Alternatively, for example, separate pieces of content may be generated for the multi-viewpoint frames of the first half of a match and the multi-viewpoint frames of the last half of the match. Note that the positions and orientations (directions) of the virtual camera that are automatically set based on the play content and the occurrence position of the play may be defined in each piece of content.

In step S801, upon receiving a request for a piece of content to be transmitted from the user terminal 130, the image processing apparatus 100 decides on the class to be transmitted through the processing of step S804 and onward, and transmits the model data for the decided class. First, in step S804, the CPU 101 of the image processing apparatus 100 acquires a vacant band of the communication line. In step S805, the CPU 101 sets the spec class of the model data based on the spec information received from the user terminal 130. For example, if the capabilities of the CPU and the GPU are low-end, model data of class 3 or class 2, which have high processing loads, cannot be processed, and therefore the spec class is set to class 1. If the display resolution is low, differences between classes are difficult to see, and therefore the spec class is set to class 2 or lower (i.e., class 1 or class 2). In step S806, the CPU 101 determines whether or not the spec class set in step S805 is class 1. If it is class 1, the processing advances to step S811, and if not, the processing advances to step S807.

Figure 11B:
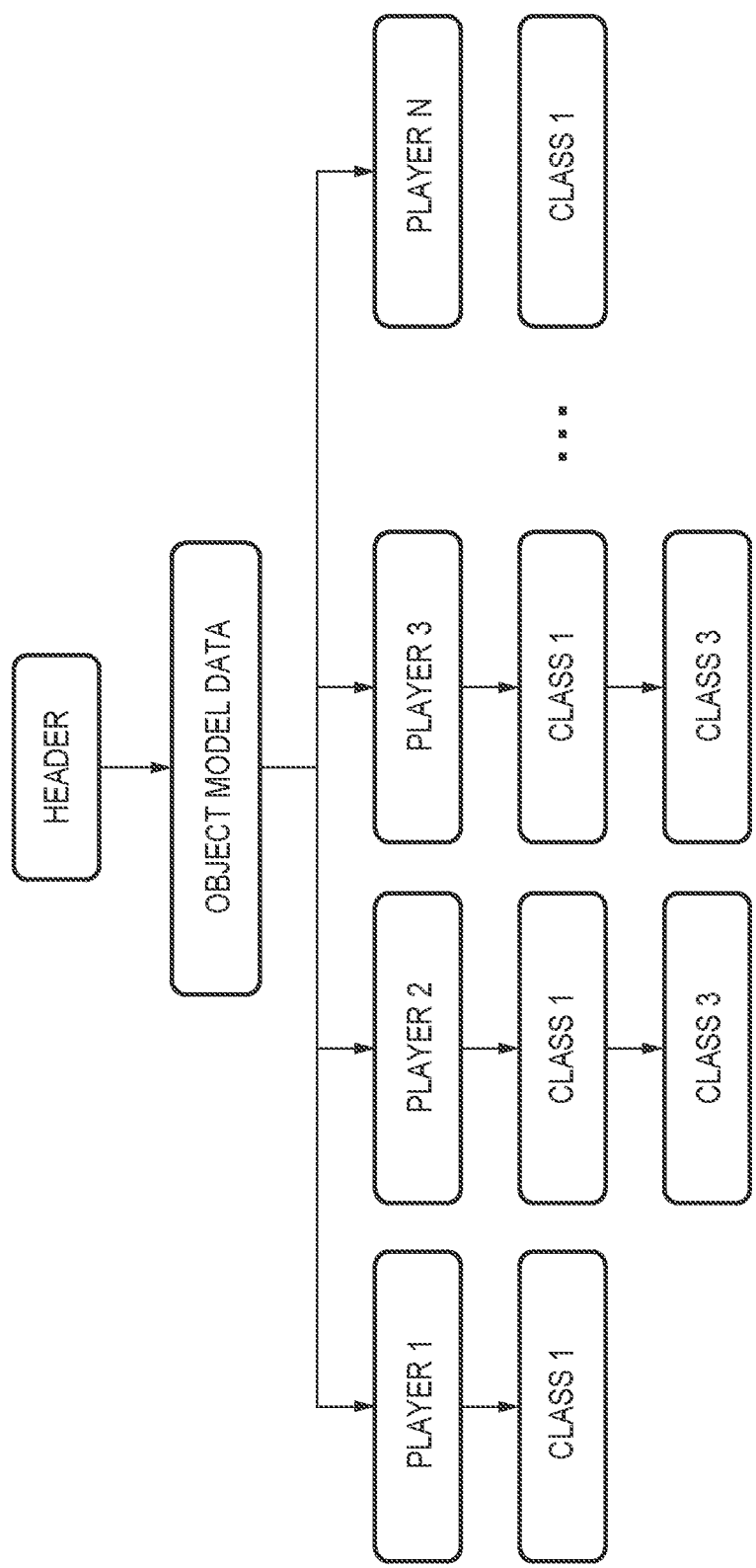

In step S807, the CPU 101 generates model data for transmission using the attribute data generated in step S303. As shown in FIGS. 11A and 11B, the model data for transmission is generated for each time code. FIG. 11A shows data for transmission at the 0-th time code. The data for transmission includes a header portion describing the data structure, the background model data, and the object model data, and holds data on the classes corresponding to the required classes for each object (each player). Note that all of the objects definitely hold model data of class 1, which is the lowest class. This is because the model data is used during later-described virtual viewpoint image generation. FIG. 11B shows data for transmission at the 1st time code. The background model data is redundant and is therefore reduced. Also, the classes of the model data of the objects are also modified according to the attribute data. The model data for transmission is obtained by connecting the data for all of the time codes together. At this time, if a required class is higher than the spec class, the required class is lowered to the spec class. Thus, the classes of the model data constituting the model data for transmission are restricted based on the ability of the display apparatus (the display unit 135 of the user terminal 130).

In step S808, the CPU 101 determines whether or not the model data for transmission can be transmitted based on the vacant band of the communication line acquired in step S804 and the size of the model data for transmission generated in step S807. If it is determined that communication is possible (YES), the processing advances to step S814, and if it is determined that communication is not possible (NO), the processing advances to step S809. In step S809, the CPU 101 generates the model data for transmission with the required classes described in the attribute data reduced by one level. For example, the required class for area 0 in Table 6c of FIG. 6C is reduced from 3 to 2, and the required class for area 2 is reduced from 2 to 1. However, if the required class is 1, it cannot be lowered any further. In step S810, the CPU 101 determines whether or not the model data for transmission can be transmitted based on the vacant band of the communication line acquired in step S804 and the size of the model data for transmission generated in step S809. If transmission is possible, the processing advances to step S814, and if transmission is not possible, the processing advances to step S811. In step S811, the CPU 101 generates model data for transmission with all of the required classes set to 1. In step S812, the CPU 101 determines whether or not the model data for transmission can be transmitted based on the vacant band of the communication line acquired in step S804 and the size of the model data for transmission generated in step S811. If the result of the determination is YES, the processing advances to step S814, and if the result of the determination is NO, the processing advances to step S813. In step S813, the CPU 101 waits until there is free space in the communication line (until the other server completes communication). In step S814, the image processing apparatus 100 transmits the model data for transmission to the display apparatus (user terminal 130) as a response to a request received in step S801.

Figure 9B:
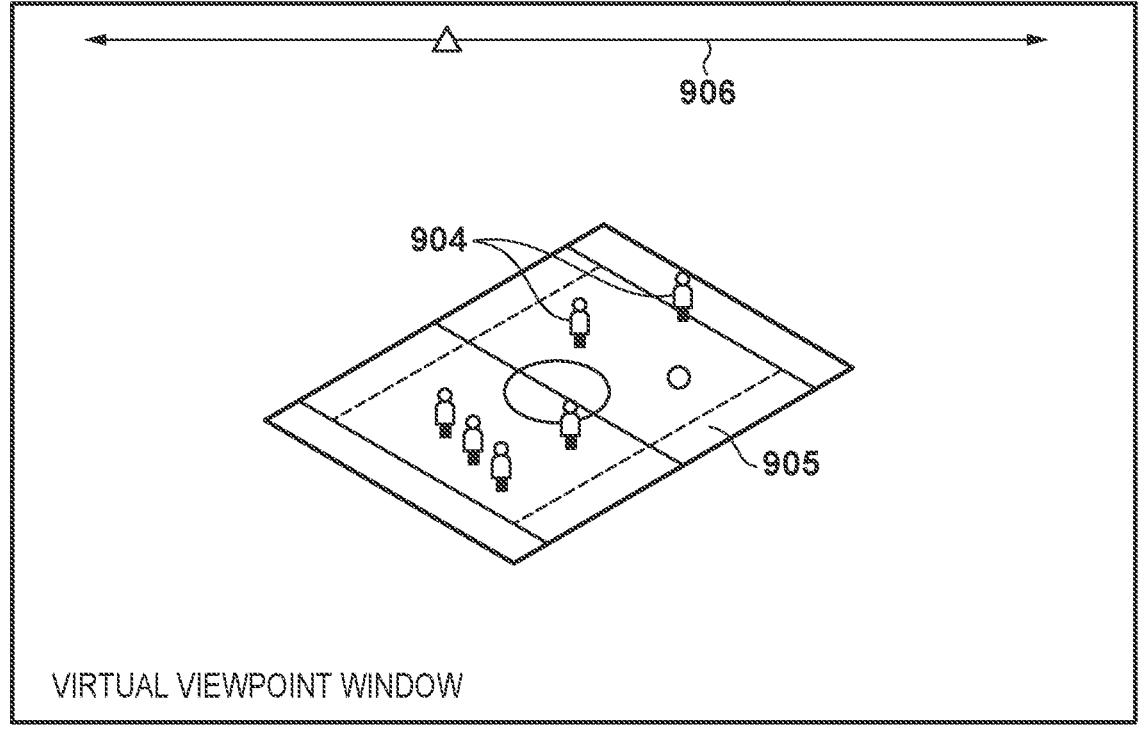

In step S815, the user terminal 130 (CPU 131) receives the model data. In step S816, the CPU 131 uses the received model data to generate a virtual viewpoint image and regenerates the virtual viewpoint image on the display unit 135. Upon receiving the model data from the image processing apparatus 100, the CPU 131 executing the application in the user terminal 130 transitions to the virtual viewpoint window 903 shown in FIG. 9B. In the virtual viewpoint window 903, player model data 904 and background model data 905 are displayed, and it is possible to display an image at any camera position/direction/angle of view according to a touch operation on the screen or the like. Also, it is possible to move to an image of any time code using a time code slider bar 906. Hereinafter, generation of a virtual viewpoint image will be described with reference to FIG. 10.

Figure 10:
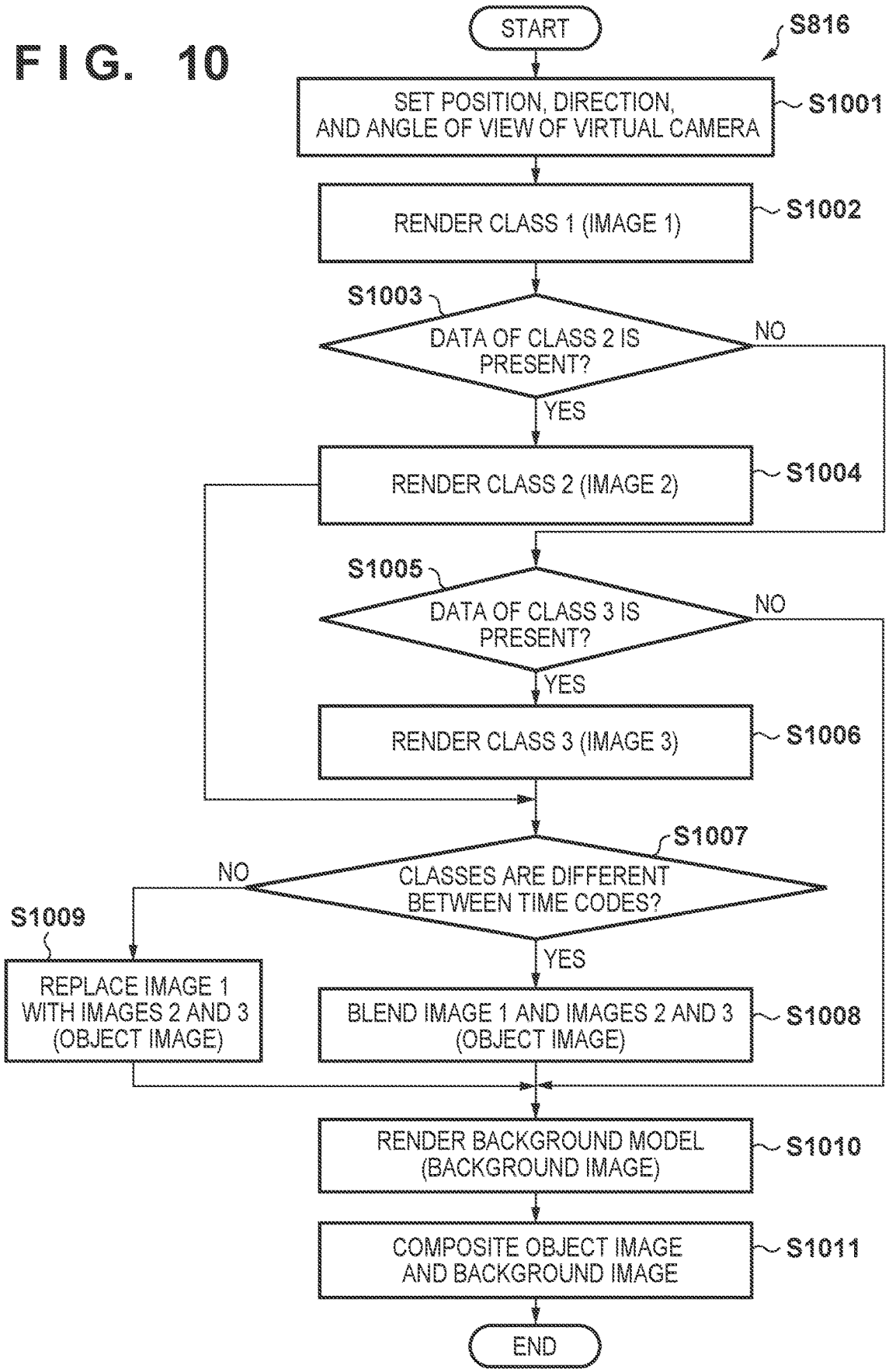
FIG. 10 is a flowchart showing processing for generating a virtual viewpoint image.

FIG. 10 is a flowchart illustrating processing for generating a virtual viewpoint image, performed by the user terminal 130, and shows step S816 in detail. In step S1001, the CPU 131 sets the position, direction, and angle of view of the virtual camera in conformity with the touch operation of the user. In step S1002, the CPU 131 uses the model data of class 1 to generate an image at the set position, direction, and angle of view of the virtual camera. Image generation can be carried out by using a known computer graphics technique.

In step S1003, the CPU 131 determines whether or not the model data of class 2 is present in the transmitted model data. If the result of the determination is YES, the processing advances to step S1004, and if the result of the determination is NO, the processing advances to step S1005. In step S1004, the CPU 131 uses the model data of class 2 to generate an image at the set position, direction, and angle of view of the virtual camera (image 2). In step S1005, the CPU 131 determines whether or not the model data of class 3 is present in the transmitted model data. If the result of the determination is YES, the processing advances to step S1006, and if the result of the determination is NO, the processing advances to step S1010. In step S1006, the CPU 131 uses the model data of class 3 to generate an image at the set position, direction, and angle of view of the virtual camera (image 3).

In step S1007, the CPU 131 determines whether or not there is a difference in the classes of the player models at continuous time codes (a previous time code and a current time code). This is a case in which, for example, the class of player 2 is 1 at time code 0, and the class of player 2 is 3 at time code 1. If there is a difference, the processing advances to step S1008, and if there is no difference, the processing advances to step S1009. In step S1008, the CPU 131 generates an object image by compositing (e.g., alpha blending) the image 1 and the image 2, or the image 1 and the image 3. This is done to prevent the image quality from changing rapidly when there is a difference in classes between time codes. On the other hand, in step S1009, the CPU 131 generates the object image by replacing the object region of image 1 with image 2 or image 3, which have high image quality. In step S1010, the CPU 131 generates a background image by rendering the background model. In step S1011, the CPU 131 generates the virtual viewpoint image by compositing the object image and the background image. Note that in step S1007, if the class of the player 2 is 2 at time code 0 but the class is 1 at time code 1 (if the class decreases at continuous time codes), it is determined that there is no difference. This is because in this kind of case, the importance level of the object decreases, and thus there is no problem if the image quality rapidly changes. Note that in the description above, the image is composited if the image changes from class 1 to class 2 or class 3 and the image is not composited otherwise, but there is no limitation to this. For example, the object image of the unchanged class and the object image of the changed class may be composited when the class of the model data of the object changes.

As described above, with the image processing apparatus of the first embodiment, three-dimensional object data for each object is generated with multiple classes, and the importance levels of the objects is decided based on the characteristics of the contents, such as the analysis results of a game category or an actual game. Also, since the class of the model data constituting the model data for transmission is set according to the importance level, the model data for the virtual viewpoint image corresponding to the interactive operation can be generated suitably and transmitted efficiently.

Second Embodiment

In the second embodiment, a configuration in which the attribute data is corrected based on the degree of involvement in the game, the attention level of an object, and user preference will be described. Note that description of systems and processing that is redundant with the description of the first embodiment will be omitted.

Figure 12A:
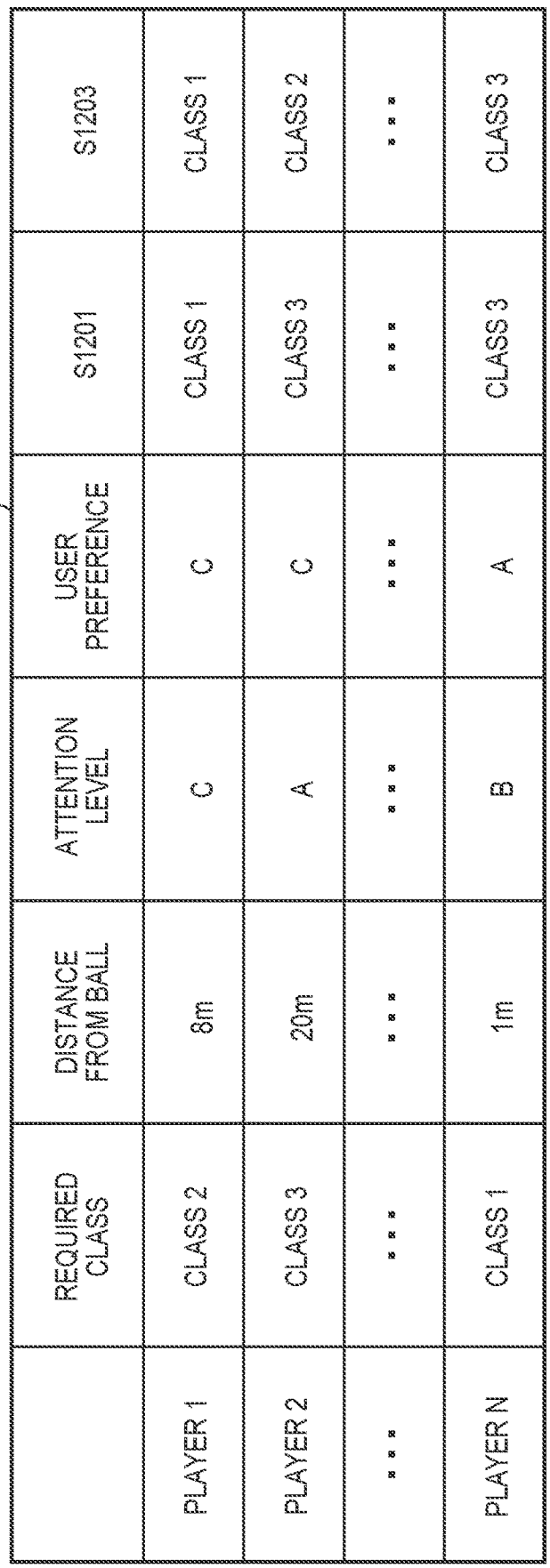
FIGS. 12A and 12B are diagrams illustrating processing for correcting attribute data.

In the first embodiment, the type of game, area, and occurring events such as an important play are used to determine the importance of the model data of the objects and decide the classes to be used. In the second embodiment, the required class is further changed using the attention level of a player who is an object (e.g., whether or not the player is famous), user preference (e.g., whether or not the user likes the player), and degree of involvement in the game (e.g., distance from the ball). In FIG. 12A, Table 12a shows an example of changing the class based on the attention level, preference, and degree of involvement. The degree of involvement, which is the distance between the ball and the player, is automatically acquired by the CPU 101 by analyzing the image data. The attention level and the preference are content set by the user via a predetermined user interface on the user terminal 130. The settings performed by the user are notified to the image processing apparatus 100 through communication from the user terminal 130. The field for the required class in Table 12a shows examples of the classes of the model data of the objects, which were decided on based on the attribute data. The classes shown in the field for steps S1201 and S1203 in Table 12a indicate classes resulting from modification based on the attention level, preference, and degree of involvement in steps S1201 and S1203 in the flowchart shown in FIG. 12B.

Figure 12B:
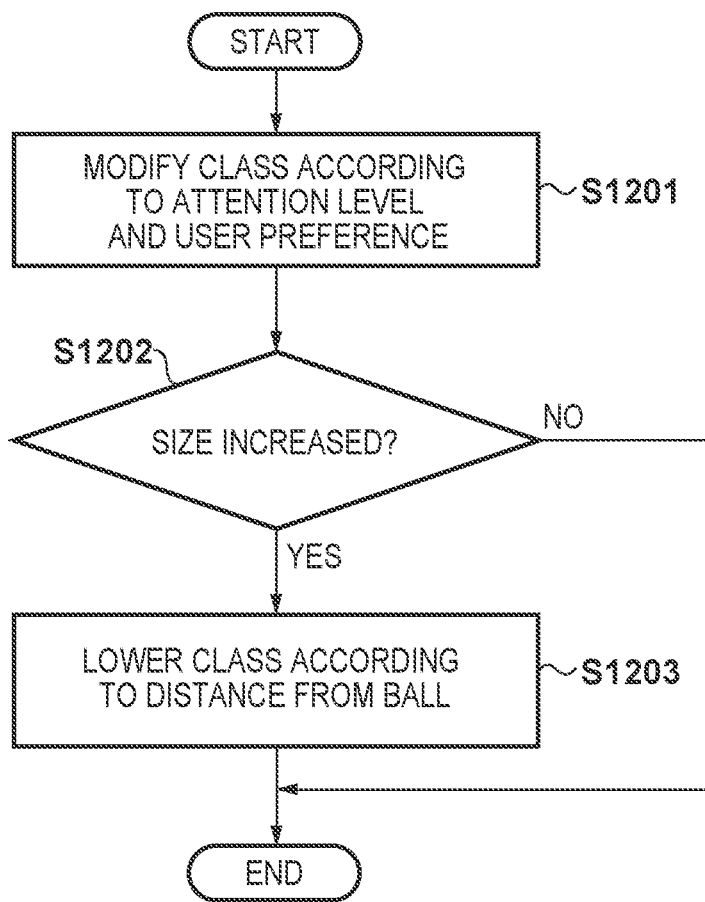

FIG. 12B is a flowchart illustrating class modification processing performed on the objects (players) after the attribute data is generated in step S303 of FIG. 3. In step S1201, the CPU 101 of the image processing apparatus 100 modifies the classes of the players based on the attention level and the preference in Table 12a. For example, the classes are changed in accordance with a rule set in advance, such as the required class being reduced by 1 for a player whose attention level and preference are both low, and the required class being set to the highest class for a player whose attention level and preference are both high. In the present example, a player N had a required class of class 1, but since the player N has a high attention level and preference, the class has been increased to 3. On the other hand, a player 1 had a required class of class 2, but since the player 1 has a low attention level and preference, the class has been reduced to 1.

In step S1202, the CPU 101 determines whether or not the size of the model data for transmission will increase after modification. If the result of the determination is YES, the processing advances to step S1203, and if the result of the determination is NO, the processing ends. In step S1203, the class is reduced according to the degree of involvement (distance from the ball) in Table 12a in order to reduce the size of the model data for transmission. For example, although the player 2 was at class 3 after step S1201, the distance between the player 2 and the ball increases, and therefore it is determined that the degree of involvement in the game of the player 2 is low, and the player 2 is lowered to class 2. For example, the CPU 101 decides on the model data (three-dimensional geometric data, texture data) to be provided to the display apparatus 130 such that the quality of the three-dimensional geometric data of a player (specific object) whose distance from the ball is less than a threshold value is higher than the quality of the three-dimensional geometric data of a player whose distance from the ball is greater than or equal to the threshold value, among the multiple players.

As described above, according to the second embodiment, when a class to be used is selected from model data of multiple classes generated for each object, attributes relating to the individual objects, such as the attention level of the object, user preference, and degree of involvement in the game, are considered. As a result, it is possible to generate more suitable model data for transmission, and it is possible to efficiently transmit the model data for the virtual viewpoint image corresponding to the interactive operation. Note that in the description above, the degree of involvement, the attention level, and the preference are illustrated as attributes relating to the individual objects, but there is no limitation thereto. Although both the attention level and the preference were considered in step S1201, it is also possible to use a configuration in which one of them is considered.

Third Embodiment

In the second embodiment, a configuration was described in which the required class is modified based on the attributes set for the individual objects. In the third embodiment, a configuration will be described in which the required classes are modified according to the position, orientation, and angle of view of the virtual camera to optimize the model data for transmission when the three-dimensional data is transmitted as a stream. Note that description of systems and processing that is redundant with the description of the first embodiment and the second embodiment will be omitted.

In stream transmission, the model data at time code M is transmitted from the image processing apparatus 100 and is received and regenerated by the display apparatus. Thereafter, the position and orientation of the virtual camera are fed back from the user terminal 130, and based on the fed-back position and orientation, the image processing apparatus 100 transmits model data for time code M+1. By sequentially repeating this processing, the interactive virtual viewpoint image can be regenerated by the display apparatus without waiting for all of the data to be received. At this time, a more optimal class can be selected with consideration given to the virtual camera position and orientation of the previous time code.

Figure 13A:
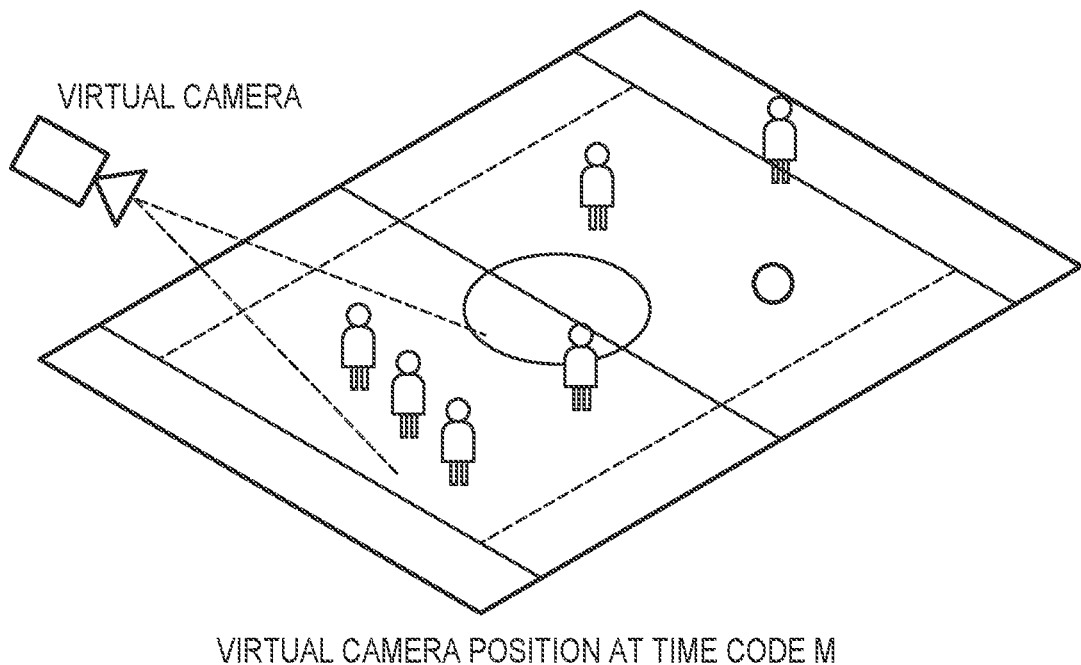
FIGS. 13A to 13C are diagrams illustrating another example of processing for correcting attribute data.

FIG. 13A shows the position/orientation/angle of view of the virtual camera at a certain time code M. At this time, there is a high probability that players in or near the angle view of the virtual camera will be included in the image at the next time code as well. On the other hand, there is a low probability that players who are far from being in the angle of view will be included in the image. Also, if the distance from the virtual camera is great, differences in image quality between classes are not likely to occur. These items are summarized in Table 13b of FIG. 13B. Note that in Table 13b, an example is shown in which the required classes set based on the attribute data are modified through the processing (steps S1301 and S1303) in FIG. 13C.

Figures 13B, 13C:
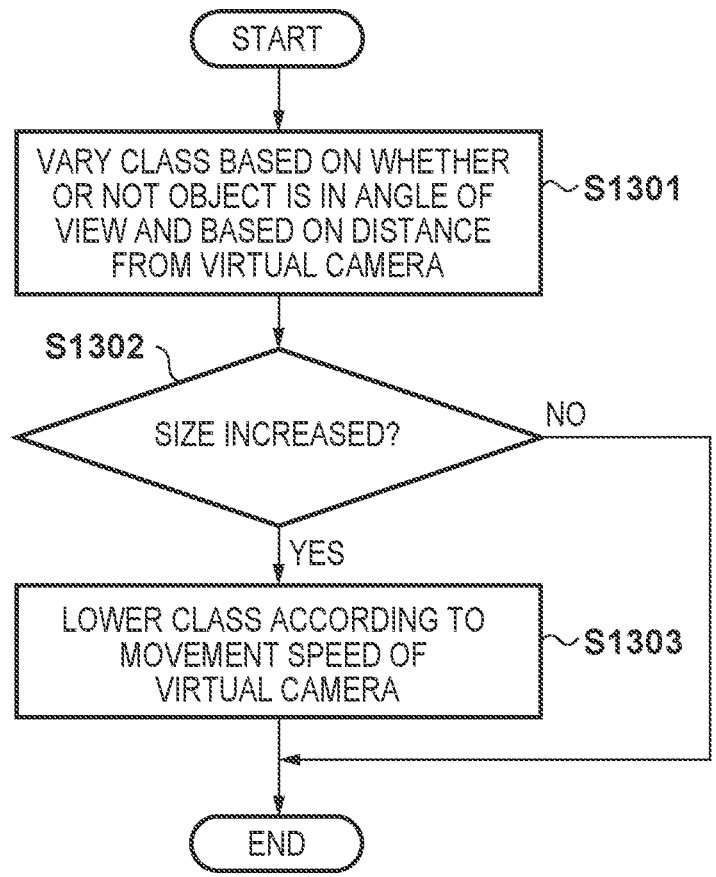

FIG. 13C is a flowchart illustrating processing for adjusting classes during streaming. In step S1301, the CPU 101 modifies the required classes based on whether the players are in the angle of view of the camera (○), in a region near the angle of view (Δ), or not in the angle of view (x), and based on the distance between the virtual camera and the players. For example, although the player N had a required class of 1, near the angle of view, the distance from the virtual camera is short, and therefore the class of the player N is raised to 3. On the other hand, although the required class of a player 2 was 3, the distance from the virtual camera is great, and therefore the class of the player 2 is lowered to 2.

In step S1302, the CPU 101 determines whether or not the size of the model data for transmission will increase after modification. If the result of the determination is YES, the processing advances to step S1303, and if the result of the determination is NO, the processing ends. In step S1303, the CPU 101 lowers the class according to the movement speed of the virtual camera and the distance between the virtual camera and the players in order to reduce the size. Note that the movement speed of the virtual camera is calculated based on the amount of change in the position and orientation in the previous frame and the frame before that. For example, a case is considered in which the movement speed of the virtual camera is fast. In this case, although the player 2 had class 2 after step S1301, the distance from the virtual camera is large, and therefore the player 2 moves quite fast in the image. For this reason, it is determined that hardly any difference in image quality for each class will occur, and the classes are lowered to class 1.

As described above, according to the third embodiment, the classes of the objects are modified based on the position/orientation/angle of view of the virtual camera designated by the user terminal, and therefore suitable model data for transmission can be generated according to the state of the virtual camera. Note that in the above-described embodiments, description was given with a focus on an example in which model data of multiple classes having different data sizes are generated for each object. However, it is also possible to generate model data of multiple classes for only one or more specific objects among the multiple objects.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-179010, filed Sep. 19, 2017, which is hereby incorporated by reference herein in its entirety.

What is claimed is:

1. An image generating apparatus comprising:
one or more hardware processors; and
one or more memories storing one or more programs configured to be executed by the one or more hardware processors, the one or more programs including instructions for;
receiving three-dimensional shape data representing a three-dimensional shape of a specific object and three-dimensional shape data representing a three-dimensional shape of a background object different from the specific object, wherein the three-dimensional shape data representing the three-dimensional shape of the specific object and the three-dimensional shape data representing the three-dimensional shape of the background object are used for generating a virtual viewpoint image that is based on a plurality of captured images captured by a plurality of imagining apparatuses, and the three-dimensional shape data representing the three-dimensional shape of the specific object is determined from a plurality of three-dimensional shape data including three-dimensional shape data represented by point clouds or voxels and three-dimensional shape data represented by meshes; and
generating a virtual viewpoint image based on the three-dimensional shape data representing the three-dimensional shape of the specific object and the three-dimensional shape data representing the three-dimensional shape of the background object.

2. An image generating apparatus comprising:
one or more hardware processors; and
one or more memories storing one or more programs configured to be executed by the one or more hardware processors, the one or more programs including instructions for;
receiving three-dimensional shape data representing a three-dimensional shape of a specific object and three-dimensional shape data representing the three-dimensional shape of a background object different from the specific object, wherein the three-dimensional shape data representing the three-dimensional shape of the specific object and the three-dimensional shape data representing the three-dimensional shape of the background object are used for generating a virtual viewpoint image that is based on a plurality of captured images captured by a plurality of imagining apparatuses, and a frequency of receiving the three-dimensional shape data representing the three-dimensional shape of the background object is less than a frequency of receiving the three-dimensional shape data representing the three-dimensional shape of the specific object; and
generating a virtual viewpoint image based on the three-dimensional shape data representing the three-dimensional shape of the specific object and the three-dimensional shape data representing the three-dimensional shape of the background object.

3. An image generating method comprising:
receiving three-dimensional shape data representing a three-dimensional shape of a specific object and three-dimensional shape data representing a three-dimensional shape of a background object different from the specific object, wherein the three-dimensional shape data representing the three-dimensional shape of the specific object and the three-dimensional shape data representing the three-dimensional shape of the background object are used for generating a virtual viewpoint image that is based on a plurality of captured images captured by a plurality of imagining apparatuses, and the three-dimensional shape data representing the three-dimensional shape of the specific object is determined from a plurality of three-dimensional shape data including three-dimensional shape data represented by point clouds or voxels and three-dimensional shape data represented by meshes; and
generating a virtual viewpoint image based on the three-dimensional shape data representing the three-dimensional shape of the specific object and the three-dimensional shape data representing the three-dimensional shape of the background object.

4. An image generating method comprising:
receiving three-dimensional shape data representing a three-dimensional shape of a specific object and three-dimensional shape data representing a three-dimensional shape of a background object different from the specific object, wherein the three-dimensional shape data representing the three-dimensional shape of the specific object and the three-dimensional shape data representing the three-dimensional shape of the background object are used for generating a virtual viewpoint image that is based on a plurality of captured images captured by a plurality of imagining apparatuses, and a frequency of receiving the three-dimensional shape data representing the three-dimensional shape of the background object is less than a frequency of receiving the three-dimensional shape data representing the three-dimensional shape of the specific object; and
generating a virtual viewpoint image based on the three-dimensional shape data representing the three-dimensional shape of the specific object and the three-dimensional shape data representing the three-dimensional shape of the background object.

5. A non-transitory computer-readable storage medium for storing a computer program configured to cause a computer to execute an image generating method comprising:
receiving three-dimensional shape data representing a three-dimensional shape of a specific object and three-dimensional shape data representing a three-dimensional shape of a background object different from the specific object, wherein the three-dimensional shape data representing the three-dimensional shape of the specific object and the three-dimensional shape data representing the three-dimensional shape of the background object are used for generating a virtual viewpoint image that is based on a plurality of captured images captured by a plurality of imagining apparatuses, and the three-dimensional shape data representing the three-dimensional shape of the specific object is determined from a plurality of three-dimensional shape data including three-dimensional shape data represented by point clouds or voxels and three-dimensional shape data represented by meshes; and generating a virtual viewpoint image based on the three-dimensional shape data representing the three-dimensional shape of the specific object and the three-dimensional shape data representing the three-dimensional shape of the background object.

6. A non-transitory computer-readable storage medium for storing a computer program configured to cause a computer to execute an image generating method comprising:

receiving three-dimensional shape data representing a three-dimensional shape of a specific object and three-dimensional shape data representing a three-dimensional shape of a background object different from the specific object, wherein the three-dimensional shape data representing the three-dimensional shape of the specific object and the three-dimensional shape data representing the three-dimensional shape of the background object are used for generating a virtual viewpoint image that is based on a plurality of captured images captured by a plurality of imagining apparatuses, and a frequency of receiving the three-dimensional shape data representing the three-dimensional shape of the background object is less than a frequency of receiving the three-dimensional shape data representing the three-dimensional shape of the specific object; and generating a virtual viewpoint image based on the three-dimensional shape data representing the three-dimensional shape of the specific object and the three-dimensional shape data representing the three-dimensional shape of the background object.

* * * * *